US007292290B2

(12) United States Patent
Miyagawa et al.

(10) Patent No.: US 7,292,290 B2
(45) Date of Patent: Nov. 6, 2007

(54) ELECTRO-OPTICAL DEVICE AND ELECTRONIC APPARATUS

(75) Inventors: Sakiko Miyagawa, Nagano (JP); Shinichi Kobayashi, Nagano (JP)

(73) Assignee: Seiko Epson Corporation (JP)

( * ) Notice: Subject to any disclaimer, the term of this patent is extended or adjusted under 35 U.S.C. 154(b) by 113 days.

(21) Appl. No.: 11/131,696

(22) Filed: May 18, 2005

(65) Prior Publication Data

US 2005/0286008 A1    Dec. 29, 2005

(30) Foreign Application Priority Data

Jun. 25, 2004    (JP) ............................. 2004-188352

(51) Int. Cl.
*G02F 1/1333* (2006.01)
(52) U.S. Cl. .................... 349/58; 361/681; 362/634
(58) Field of Classification Search ................ 362/634; 349/12, 58, 65, 122, 158; 53/419; 361/681
See application file for complete search history.

(56) References Cited

U.S. PATENT DOCUMENTS

| | | | | |
|---|---|---|---|---|
| 4,310,908 | A * | 1/1982 | Fuerneisen | 368/88 |
| 5,710,607 | A * | 1/1998 | Iwamoto et al. | 349/60 |
| 5,866,183 | A * | 2/1999 | Small | 426/383 |
| 6,373,537 | B2 * | 4/2002 | Yun et al. | 349/58 |
| 6,549,263 | B1 * | 4/2003 | Kim | 349/58 |
| 2001/0010569 | A1 * | 8/2001 | Jin et al. | 349/58 |
| 2001/0019377 | A1 * | 9/2001 | Fukayama et al. | 349/58 |
| 2002/0167626 | A1 * | 11/2002 | Matsuda et al. | 349/65 |
| 2005/0094052 | A1 * | 5/2005 | Sakurai et al. | 349/58 |
| 2005/0094053 | A1 * | 5/2005 | Byun | 349/58 |

FOREIGN PATENT DOCUMENTS

| | | |
|---|---|---|
| JP | 11-258618 | 9/1999 |
| JP | 2003-308023 | 10/2003 |
| JP | 2003-330377 | 11/2003 |

* cited by examiner

*Primary Examiner*—Andrew Schechter
*Assistant Examiner*—Matthew P Lawson
(74) *Attorney, Agent, or Firm*—Harness, Dickey & Pierce, P.L.C.

(57) ABSTRACT

An electro-optical device includes an electro-optical panel, a frame, and an adhesion base. The panel includes a substrate holding an electro-optical material, a side of the electro-optical panel for displaying an image having a display area and a non-display area. The frame holds the electro-optical panel and has a side wall disposed in correspondence with at least a side surface of the electro-optical panel. An adhesion base has a form extending continuously at least from the non-display area to the side wall and is adhered to the non-display area and the side wall.

15 Claims, 8 Drawing Sheets

ELECTRO-OPTICAL DEVICE AND ELECTRONIC APPARATUS

BACKGROUND OF THE INVENTION

1. Technical Field

The present invention relates to an electro-optical device used in, for example, a personal computer or a cellular phone, and to an electronic apparatus using the electro-optical device.

2. Related Art

Hitherto, an electro-optical device, such as a liquid crystal device, serving as a display device, of an electronic apparatus, such as a personal computer or a cellular phone, has been widely used.

There is a demand for personal computers, cellular phones, etc., to be smaller and lighter and to have a higher resistance to external shock applied when carrying such apparatuses. For the purposes of size reduction and increasing shock resistance, for example, a method which provides a shock-absorbing material having an adhesion portion for being adhered to a liquid crystal panel has been proposed (see, for example, Japanese Unexamined Patent Application Publication No. 2003-308023 (paragraphs 0009 to 0011, and FIG. 1)).

However, although this method makes it possible to achieve size reduction and increase shock resistance, since, for example, a display area of a liquid crystal device is enlarged and its external shape is increasingly reduced, the holding power of a frame which holds a liquid crystal panel and an illuminating device (such as a backlight unit) is reduced. Therefore, for example, the liquid crystal panel may fly out of the frame of the liquid crystal device by, for example, external shock of an electronic apparatus.

SUMMARY

An advantage of the invention is that it provides an electro-optical device which can prevent, for example, a liquid crystal panel from flying out of or becoming displaced from a frame, and an electronic apparatus using the electro-optical device. Another advantage of the invention is that it prevents, for example, a liquid crystal panel from flying out of or becoming displaced from a frame easily and at a low cost without increasing the number of parts and steps while preventing malfunctioning of, for example, a liquid crystal driving IC caused by light.

An electro-optical device according to a first aspect of the invention comprises an electro-optical panel, a frame, and an adhesion base. The electro-optical panel includes a substrate holding an electro-optical material, a side of the electro-optical panel for displaying an image having a display area and a non-display area. The frame holds the electro-optical panel and has at least one side wall disposed in correspondence with at least a side surface of the electro-optical panel. The adhesion base has a form extending continuously at least from the non-display area to the side wall, and is adhered to the non-display area and the side wall.

Here, "adhesion base" refers to, for example, a light-shielding member having an adhesion surface or a flexible board similarly having an adhesion surface. A separate adhesive tape may be disposed as an adhesion base in order to prevent, for example, the flying out or displacement of a liquid crystal panel.

According to the first aspect of the invention, since the adhesion base having a form which extends continuously over the non-display area of a surface of an image display side of the electro-optical panel and the side wall of the frame which holds the electro-optical panel is adhered to the side wall and the non-display area, it is possible to prevent the electro-optical panel from flying out of or becoming displaced from the frame due to, for example, shock applied to the frame. In addition, since the adhesion base is adhered to the non-display area of the electro-optical panel, it is possible to prevent the adhesion base from hindering the display of the electro-optical device.

It is preferable that the at least one side wall include a first side wall and a second side wall, the first and second side walls being disposed in correspondence with side surfaces of the electro-optical panel and opposing each other with the non-display area being disposed therebetween, and that the adhesion base have a form extending continuously at least from the non-display area to the first side wall and be adhered to the non-display area and the first side wall. Accordingly, it is possible for, for example, the adhesion base to be adhered from a portion of the first side wall of the frame to a portion of the non-display area of the electro-optical panel, so that a compact adhesion base can be used to prevent, for example, the electro-optical panel from flying out of or becoming displaced from the frame. In addition, since the first and second side walls of the frame are disposed on both sides of the non-display area of the electro-optical panel, it is possible to reliably prevent, for example, the displacement of the electro-optical panel.

An electro-optical device according to a second aspect of the invention comprises an electro-optical panel, a frame, and at least one adhesion base. The electro-optical panel includes a first substrate and a second substrate. The second substrate extends beyond the first substrate and has a protrusion on which an integrated circuit for driving an electro-optical material is mounted. The first substrate and the second substrate oppose each other with the electro-optical material being disposed therebetween. The frame holds the electro-optical panel and has at least one side wall disposed in correspondence with at least a side surface of the electro-optical panel. The at least one adhesion base has a form extending continuously at least from the protrusion to the side wall, and is adhered to the protrusion and the side wall.

Since the adhesion base having a form which continuously extends over the protrusion of the second substrate of the electro-optical panel and the side wall of the frame which holds the electro-optical panel is adhered to the protrusion and the side wall, it is possible to prevent the electro-optical panel from flying out of or becoming displaced from the frame due to, for example, shock applied to the frame. In addition, since the adhesion base is adhered to the protrusion, which is also a non-display area of the electro-optical panel, it is possible to prevent the adhesion base from hindering the display of the electro-optical device.

It is preferable that the at least one side wall include a first side wall and a second side wall, the first and second side walls being disposed in correspondence with side surfaces of the electro-optical panel and opposing each other with the protrusion being disposed therebetween, and that the adhesion base have a form extending continuously at least from the protrusion to the first side wall and be adhered to the protrusion and the first side wall. Accordingly, it is possible to, for example, adhere the adhesion base from a portion of the first side wall of the frame to a portion of the protrusion of the electro-optical panel, so that a compact adhesion base can be used to prevent, for example, the electro-optical panel from flying out of or becoming displaced from the frame. In addition, since the first and second side walls of the frame are disposed on both sides of the protrusion of the electro-optical panel, it is possible to more reliably prevent, for example, the displacement of the electro-optical panel.

It is preferable that the frame have the first and second side walls continuously disposed therewith and a bottom opposing the electro-optical panel, and that the adhesion base extend at least from the first side wall to a surface of the bottom opposite to the electro-optical panel and be adhered to the opposite surface. Accordingly, it is possible to increase the adhesion area of the adhesion base and the frame in order to further prevent, for example, the electro-optical panel from flying out of or becoming displaced from the frame.

It is preferable that the adhesion base extend to the second side wall from the protrusion and be adhered to the second side wall. Accordingly, it is possible to continuously adhere the adhesion base from the first side wall to the second side wall as a result of traversing it across the protrusion and to firmly hold down the electro-optical panel in the frame from thereabove. Therefore, it is possible to more reliably prevent, for example, the electro-optical panel from flying out of or becoming displaced from the frame.

It is preferable that the protrusion have a first area disposed adjacent the first side wall and a second area disposed adjacent the second side wall, and that the at least one adhesion base include a first adhesion base and a second adhesion base. The first adhesion base has a form extending continuously at least from the first area to the first side wall and is adhered to the first area and the first side wall. The second adhesion base has a form extending continuously at least from the second area to the second side wall and is adhered to the second area and the second side wall. Accordingly, the electro-optical panel can be secured in the frame in a balanced manner from both side walls with the adhesion base. In addition, when an area overlapping the electro-optical panel is minimized, even if the protrusion is not flat or, for example, an electronic component is mounted to the protrusion, the adhesion is performed so as to avoid the portion that is not flat or the electronic part, thereby allowing efficient adhesion.

It is preferable that the at least one adhesion base be a light-shielding member which is adhered to a side of the protrusion opposite to the side where the integrated circuit is mounted and which intercepts light propagating towards the integrated circuit. Accordingly, even if, for example, a liquid crystal driving IC is mounted to the protrusion, malfunctioning of the liquid crystal driving IC caused by light is prevented from occurring by shielding the liquid crystal driving IC from light, and the electro-optical panel is prevented from, for example, flying out of or becoming displaced from the frame by the light-shielding member. In addition, since the light-shielding member is used to, for example, prevent the electro-optical panel from flying out, an additional part is not required, thereby reducing costs. Further, since the adhesion of the adhesion member can be performed by a related step of adhering a light-shielding member, the number of steps is not increased.

It is preferable that the electro-optical device further comprise a flexible circuit board electrically connected to the electro-optical panel, and that the at least one adhesion base be an extending portion extending from the flexible circuit board. Accordingly, it is possible to restrict, for example, the flying out of or displacement of the electro-optical panel from the frame by providing an extending portion of the flexible circuit board electrically connected to the electro-optical panel and by, for example, bending the extending portion from its side adjacent the side wall of the frame and adhering the extending portion to the protrusion with, for example, a double faced adhesive tape.

It is preferable that the electro-optical device further comprise a flexible circuit board electrically connected to the electro-optical panel, and that the at least one adhesion base include a first adhesion base and a second adhesion base. The first adhesion base is a light-shielding member which is adhered to a side of the protrusion opposite to the side where the integrated circuit is mounted and which intercepts light propagating towards the integrated circuit. The second adhesion base is an extending portion extending from the flexible circuit board. Accordingly, since, for example, the electro-optical panel is first held down by the flexible board, then is covered with the light-shielding member from thereabove, and is adhered, it is possible to further restrict, for example, the flying out of or displacement of the electro-optical panel from the frame. In addition, since the electro-optical panel is covered with the light-shielding member, even if, for example, a liquid crystal driving IC is mounted to the protrusion, malfunctioning of the liquid crystal driving IC caused by light is prevented from occurring by shielding the liquid crystal driving IC from light.

It is preferable that the electro-optical device further comprise a light guide plate secured to the electro-optical panel and guiding light to the electro-optical panel and a flexible circuit board electrically connected to the electro-optical panel, that a light source for supplying light to the light guide plate be mounted to the flexible circuit board, that the bottom of the frame have an opening for inserting the light source, that the flexible circuit board be disposed so as to cover the opening, and that the at least one adhesion base be adhered to a side of the flexible circuit board opposite to the side where the light source is mounted. Accordingly, since the adhesion base adhered to a side opposite to the side where the light source at the flexible circuit board is mounted is used to secure the flexible circuit board by holding it down towards the electro-optical panel, it is possible to prevent the problem of the light source becoming shifted vertically from the light guide plate when the flexible circuit board is raised from the light guide plate secured to the electro-optical panel. Therefore, light emitted from the light source can reliably impinge upon the light guide plate. Obviously, it is possible to prevent, for example, the electro-optical panel from flying out of or becoming displaced from the frame by the adhesion base. Here, the opening is formed in correspondence with the light source. It is, for example, a hole or a notch or a cut portion in the portion of the bottom facing the flexible board.

It is preferable that the first adhesion base overlap at least a portion of the second adhesion base and be adhered to the second adhesion base. Accordingly, since, for example, the light-shielding member is extended from the first side wall and the first area so as to overlap the flexible board adhered to the second area of the protrusion from the second side wall, the flexible board is also more firmly secured by the light-shielding member. In addition, since the light-shielding member covers the electro-optical panel from the first area to the second area of the protrusion, the light-shielding effect is increased. The flexible circuit board may be adhered so as to secure the light-shielding member.

An electronic apparatus according to a third aspect of the invention comprises any one of the above-described electro-optical devices.

Since the electronic apparatus of the invention comprises any one of the electro-optical devices which can prevent, for example, the liquid crystal panel from flying out of or becoming displaced from the frame easily and at a low cost without increasing the number of parts and steps, the electronic apparatus is of high quality and is inexpensive to manufacture.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereunder, embodiments of the invention will be described with reference to the drawings. In the description of the embodiments below, a liquid crystal device, which is an example of an electro-optical device, more specifically, a transflective passive matrix liquid crystal device, and an electronic apparatus using the liquid crystal device will be described. However, the invention is not limited thereto. In the figures below, for easier understanding of each structure, for example, the number of components and the scale in each structure are different from those in each actual structure.

First Embodiment

Figure 1:
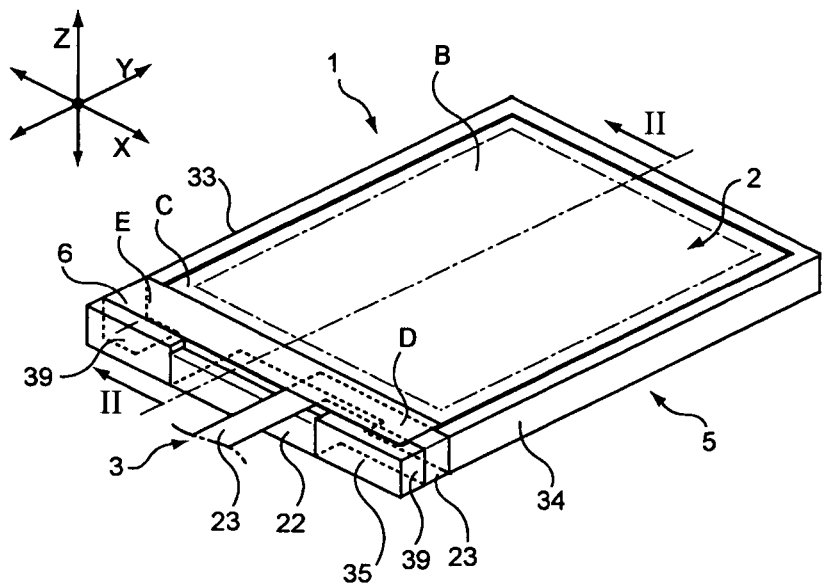
FIG. 1 is a schematic perspective view of a liquid crystal device according to a first embodiment.
Figure 2:
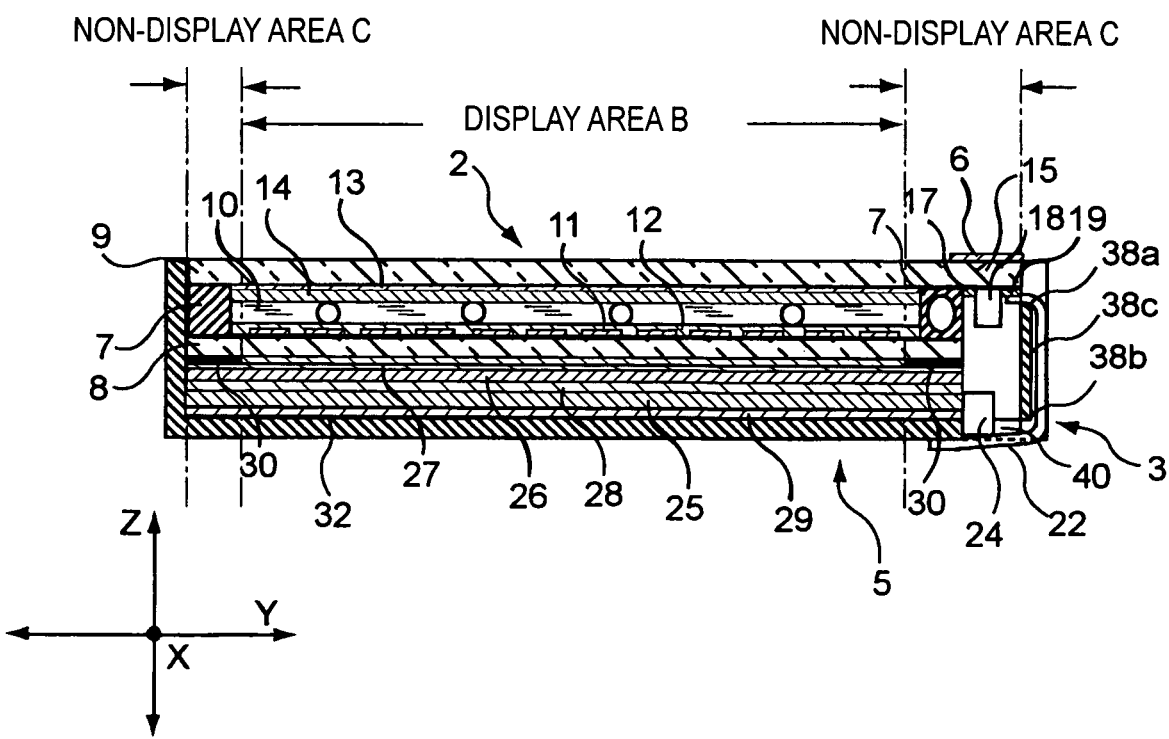
FIG. 2 is a sectional view taken along line II-II shown in FIG. 1 (a liquid crystal driving IC and a light source are not shown in cross section)
Figure 3:
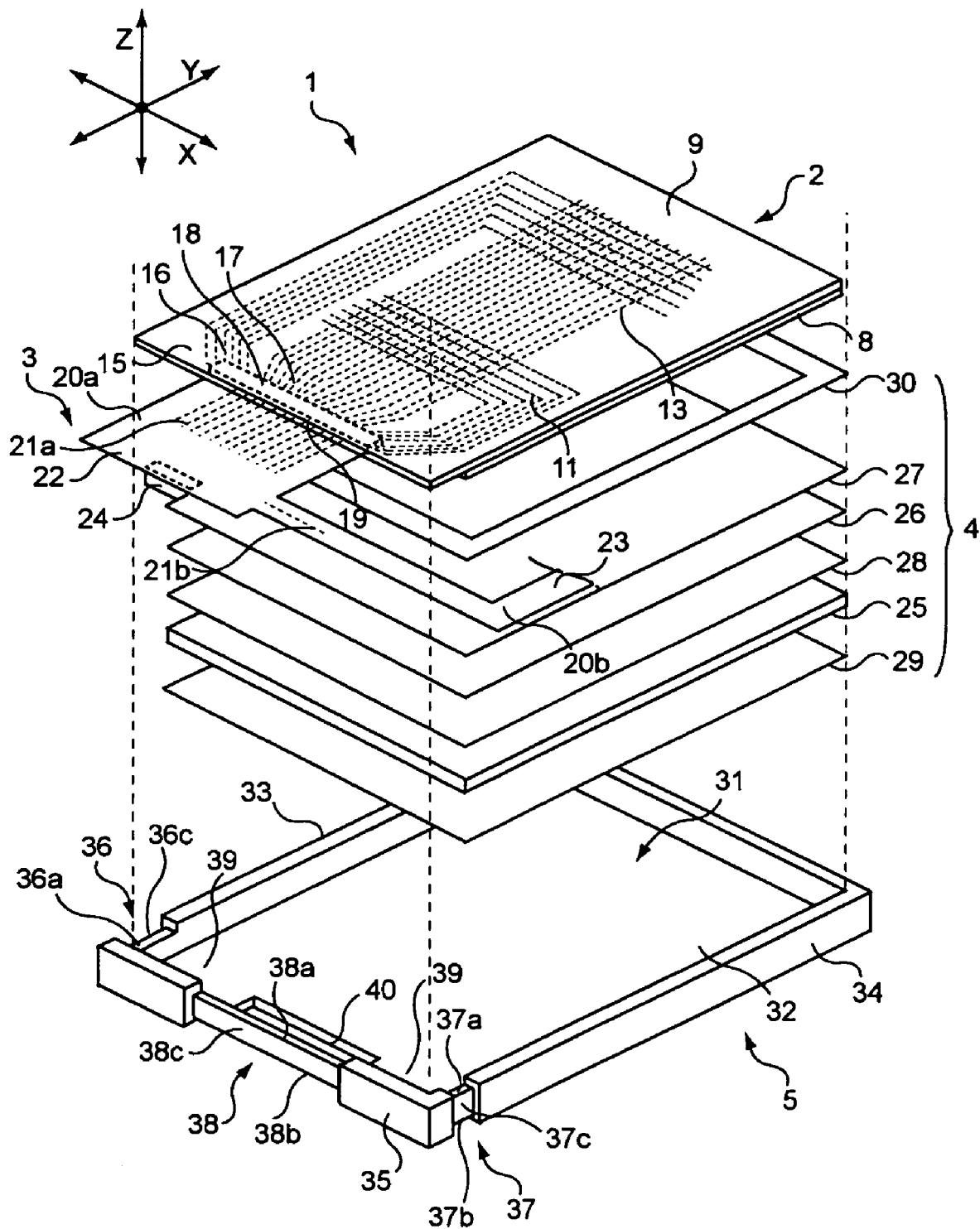
FIG. 3 is a schematic exploded perspective view of the liquid crystal device according to the first embodiment.

FIG. 1 is a schematic perspective view of a liquid crystal device according to a first embodiment of the invention. FIG. 2 is a sectional view taken along line II-II shown in FIG. 1 (a liquid crystal driving IC and a light source are not shown in cross section). FIG. 3 is a schematic exploded perspective view of the liquid crystal device.

Structure of Liquid Crystal Device

As shown in, for example, FIGS. 1 to 3, a liquid crystal device 1 comprises, for example, a liquid crystal panel 2 serving as an electro-optical panel, a flexible board 3 serving as a flexible circuit board electrically connected to the liquid crystal panel 2, an illuminator 4 for illuminating the liquid crystal panel 2 with light, a frame 5 holding the liquid crystal panel 2 and the illuminator 4, and a light-shielding member 6 for intercepting light. Here, supplemental mechanisms (not shown) other than the frame 5 are provided in the liquid crystal device 1 as required.

As shown in, for example, FIGS. 1 to 3, the liquid crystal panel 2 comprises a first substrate 8 and a second substrate 9, which are bonded together with a sealant 7, and an electro-optical material, such as super twisted nematic (STN) liquid crystals 10, sealed in the gap between the substrates 8 and 9. The liquid crystal panel 2 is accommodated in the frame 5 so that its display surface is disposed at the side where the second substrate 9 is disposed.

As shown in, for example, FIGS. 2 and 3, common electrodes 11 are formed with a predetermined pattern on the surface of the first substrate 8 facing the liquid crystals. An overcoat layer 12 is formed on the side of the common electrodes 11 facing the liquid crystals, and an alignment layer (not shown) is formed on the overcoat layer 12. For example, a polarizer (not shown) is disposed at the outer side of the first substrate 8 (that is, the side of the first substrate 8 opposite to the liquid crystals 10).

As shown in, for example, FIGS. 2 and 3, segment electrodes 13 are formed with a predetermined pattern on the surface of the second substrate 9 facing the liquid crystals. An overcoat layer 14 is formed on the side of the segment electrodes 13 facing the liquid crystals, and an alignment layer (not shown) is formed on the overcoat layer 14. For example, a polarizer (not shown) is disposed at the outer side of the second substrate 9 (that is, the side of the second substrate 9 opposite to the liquid crystals 10).

As shown in, for example, FIG. 1, the display side of the second substrate has a display area B and a non-display area C. The display area B is substantially rectangular, is disposed inwardly of the non-display area C, and displays, for example, an image when the liquid crystals are driven. The non-display area C corresponds to an area where an image is not formed, such as a parting portion around the display area B and a protrusion of the second substrate 9.

Although not shown, if necessary, an underlying layer, a reflective layer, a coloring layer, a light-shielding layer, etc, may be disposed on the inner surface of either one of the first substrate 8 and the second substrate 9.

As shown in, for example, FIGS. 2 and 3, the first substrate 8 and the second substrate 9 are plates formed of light-transmissive material such as glass or synthetic resin. The second substrate 9 has a protrusion 15 protruding outward (that is, in the Y-axis direction in FIGS. 2 and 3) beyond the first substrate 8.

The common electrodes 11 are formed of transparent electrically conductive material, such as indium tin oxide (ITO), and in the form of stripes parallel to each other in one direction (in the X-axis direction in FIGS. 2 and 3).

Like the common electrodes 11, the segment electrodes 13 are formed of transparent electrically conductive material, such as ITO, and in the form of stripes. As shown in FIGS. 2 and 3, the segment electrodes 13 intersect the common electrodes 11 in the Y-axis direction.

As shown in, for example, FIGS. 2 and 3, the protrusion 15 includes, for example, a common electrode wiring 16, a segment electrode wiring 17, and a liquid crystal driving IC 18. The common electrode wiring 16 and the segment electrode wiring 17 extend to the protrusion 15 from an area in which the common electrodes 11 and the segment electrodes 13 are surrounded by the sealant 7. The liquid crystal driving IC 18 supplies, for example, liquid crystal driving electrical current to each of the electrode wirings.

In addition, the protrusion 15 includes, for example, an external terminal 19 for receiving electrical current from, for example, the flexible board 3 and an input wiring (not shown) for supplying electrical current to the liquid crystal driving IC 18 from an external device.

When the liquid crystal driving IC 18 receives various signals regarding, for example, a display image via the flexible board 3, the external terminal 19, etc., the liquid crystal driving IC 18 generates a drive signal in accordance with the received signals and supplies it to the common electrode wiring 16 and the segment electrode wiring 17.

As shown in, for example, FIGS. 1 to 3, in the flexible board 3, wiring patterns 21 (comprising wiring patterns 21*a* and 21*b*) and electronic components, such as a capacitor or an IC, are mounted on bases 20 (comprising bases 20*a* and 20*b*). Here, the bases 20 are flexible films and the wiring patterns 21 are formed of, for example, copper. Although not shown, a double faced adhesive sheet is adhered to the surface of the flexible board 3 secured to, for example, the frame 5. Therefore, it is possible to prevent, for example, the liquid crystal panel 2 from flying out of or becoming displaced from the frame 5 by the flexible board 3 as described below.

The flexible board 3 also includes a body 22 and a right branch 23 serving as an extending portion extending from the body 22. The right branch 23 is electrically connected to an external circuit (not shown).

A body connection terminal (not shown) is formed at an end of the body 22 adjacent the liquid crystal panel, and is electrically connected to the external terminal 19 of the liquid crystal panel 2 via an anisotropic conductive film (ACF) (not shown).

As shown in, for example, FIGS. 1 to 3, the right branch 23 extends from the right side of the body 22. One end of the wiring pattern 21*a* disposed on the base 20*a* of the body 22 is electrically connected to the wiring pattern 21*b* disposed on the base 20*b* of the right branch 23.

As shown in, for example, FIGS. 2 and 3, the illuminator 4 is accommodated in the frame 5, and is sandwiched between the liquid crystal panel 2 and the inner bottom surface defining a recess of the frame 5.

More specifically, the illuminator 4 comprises, for example, a light source 24, a light guide plate 25, two prism sheets 26 and 27, a diffusing sheet 28, a reflective sheet 29, and a light-shielding sheet 30.

The light source 24 is, for example, a light emitting diode (LED), and, as shown in FIGS. 2 and 3, is mounted to the base 20*a* of the body 22. The light source 24 is disposed so that light from the light source 24 is incident upon a light-receiving surface or an end surface of the light guide plate 25 adjacent the protrusion 15 of the second substrate 9 when the body 22 is bent so as to cover an opening in the frame 5 as shown in FIG. 1.

As shown in, for example, FIGS. 2 and 3, the light guide plate 25 is substantially rectangular, and is used to illuminate the entire diffusing sheet 28 with the incident light emitted from the light source 24. The prism sheets 26 and 27 increase the luminance of the light emitted from the light guide plate 25.

As shown in, for example, FIGS. 2 and 3, the light-shielding plate 30 has the shape of a frame having an open portion so that the central portion thereof coincides with at least the display area B of the second substrate 9, and shields the non-display area C, such as an area near the protrusion 15, from light. The light-shielding sheet 30 may be formed so that, for example, the side facing the liquid crystal panel is black and the side facing the prism sheets reflects white light or the like. This causes light leaking from, for example, the light source 24 to be reflected by the light-shielding sheet 30 and external light to be absorbed by the black surface, thereby making it possible to reduce the effects of reflection of light towards the liquid crystal driving IC 18, etc.

Here, for example, the diffusing sheet 28, the two prism sheets 26 and 27, and the light-shielding sheet 30 are disposed in that order on the light-exiting surface of the light guide 25, and the reflective sheet 29 is disposed at the surface of the light guide plate 25 opposite to its light-exiting surface. The light guide plate 25, the diffusing sheet 28, the two prism sheets 26 and 27, and the reflective sheet 29 have substantially the same size.

As shown in, for example, FIGS. 1 to 3, the frame 5 is substantially box-shaped and is open at the side facing the liquid crystal panel 2. A recess 31 having a size which is just large enough to accommodate the illuminator 4 and the liquid crystal panel 2 is formed in the frame 5. More specifically, for example, the reflective sheet 29 of the illuminator 4 and an inner bottom surface 32 defining the recess 31 are adhered to each other with, for example, a double faced adhesive sheet (not shown).

As shown in, for example, FIGS. 1 to 3, the frame 5 has the inner bottom surface 32 (bottom), a first side wall 33 (that is, the side wall on the left side of the protrusion 15 in FIG. 3), a second side wall 34 (that is, the side wall on the right side of the protrusion 15 in FIG. 3), and a third side wall 35 disposed between the first and second side walls 33 and 34 and adjacent to the protrusion of the liquid crystal panel 2. The first and second side walls are disposed parallel to each other in correspondence with side walls of the liquid crystal panel 2 and oppose each other so as to be on both sides of the non-display area C (protrusion 15) of the liquid crystal panel 2.

The first side wall 33 has a first side wall recess 36 and the second side wall 34 has a second side wall recess 37 disposed in correspondence with the first side wall recess 36 so that they sandwich portions near the protrusion of the liquid crystal panel 2. The third side wall 35 has a third side wall recess 38 at substantially the central portion.

As shown in, for example, FIG. 3, the first side wall recess 36 has a recess portion 36*a* which is formed in the upper surface of the first side wall 33 facing the display side (that is, the surface facing the Z-axis direction in the figures) and which extends in the direction of the bottom surface from the upper surface (that is, the Z-axis direction in the figures) near the protrusion 15 so as to be recessed substantially in correspondence with the thickness of the light-shielding member (described later), with the breadth of the recess portion 36*a* being in correspondence with the width of the light-shielding member.

The first side wall recess 36 also has a recess portion 36*b* (not shown) disposed opposite to the upper recess portion and extending from the bottom surface to the upper surface so as to be recessed substantially in correspondence with the thickness of the light-shielding member, with the breadth of the recess portion 36*b* being in correspondence with the width of the light-shielding member.

The first side wall recess 36 also has a recess portion 36*c* extending inward (that is, in the X-axis direction in the figures) from the outer surface (that is, the surface facing the X-axis direction in the figures) disposed between the upper and lower recess portions. The recess portion 36*c* is recessed in correspondence with the thickness of the light-shielding member, with the breadth of the recess portion 36*c* being in correspondence with the width of the light-shielding member. Accordingly, adhesion of the light-shielding member makes it possible to prevent the light-shielding member from protruding from the first side wall 33 of the frame 5 in order to reduce the size of the liquid crystal device 1 and facilitate the positioning of the light-shielding member.

As shown in, for example, FIG. 3, the second side wall recess 37 has a recess portion 37a which is formed in the upper surface of the second side wall 34 facing the display side (that is, the surface facing the Z-axis direction in the figures) and which extends in the direction of the bottom surface from the upper surface (that is, the Z-axis direction in the figures) near the protrusion 15 so as to be recessed substantially in correspondence with the thickness of the right branch 23 of the flexible board, with the breadth of the recess portion 37a being in correspondence with the width of the right branch 23.

The second side wall recess 37 also has a recess portion 37b disposed opposite to the upper recess portion and extending from the bottom surface to the upper surface so as to be recessed substantially in correspondence with the thickness of the right branch 23. The breadth of the recess portion 37b is in correspondence with the width of the right branch 23.

The second side wall recess 37 also has a recess portion 37c extending inward (that is, in a direction opposite to that of the first side wall recess) from the outer surface disposed opposite to the outer surface defining the first side wall recess and disposed between the upper and lower recess portions. The recess portion 37c is recessed in correspondence with the thickness of the right branch 23. The breadth of the recess portion 37c is in correspondence with the width of the right branch 23. Accordingly, adhesion of the right branch 23 makes it possible to prevent the right branch 23 from protruding from the second side wall 34 of the frame 5 in order to reduce the size of the liquid crystal device 1 and facilitate the positioning of the right branch 23.

As shown in, for example, FIGS. 2 and 3, the third side wall recess 38 has a recess portion 38a which is formed in the upper surface of the third side wall 35 facing the display side (that is, the surface facing the Z-axis direction in the figures) and which extends in the direction of the bottom surface to the upper surface (that is, the Z-axis direction in the figures) substantially near the central portion so as to be recessed substantially in correspondence with the sum of the thicknesses of the second substrate 9, the external terminal 19, and the body 22 of the flexible board. The breadth of the recess portion 38a is in correspondence with the width of the body.

The third side wall recess 38 also has a recess portion 38b disposed opposite to the upper recess portion, extending from the bottom surface to the upper surface, and being recessed at least substantially in correspondence with the thickness of the body 22 of the flexible board. The breadth of the recess portion 38b is in correspondence with the width of the body.

The third side wall recess 38 also has a recess portion 38c extending inward (that is, in the Y-axis direction in the figures) from the outer surface (that is, the surface facing the Y-axis direction in the figures) disposed between the upper and lower recess portions. The recess portion 38c is recessed in correspondence with the thickness of the body 22. The breadth of the recess portion 38c is in correspondence with the width of the body 22. Accordingly, adhesion of the body 22 of the flexible board 3 makes it possible to prevent the body 22 from protruding from the third side wall 35 of the frame 5 in order to reduce the size of the liquid crystal device 1 and facilitate the positioning of the body 22.

As shown in, for example, FIG. 3, the inner bottom surface 32 has an opening 40 which is formed so that portions of the inner bottom surface adjacent to the first side wall recess 36 and the second side wall recess 37 remain near the center (overlapping the protrusion 15).

As shown in FIG. 2, the opening 40 is covered with the body 22 from the outer side of the frame 5, and is formed so that the light source 24 mounted to the body 22 is inserted into the frame from the opening 40 and is disposed at the light-receiving surface (not shown) of the light guide plate 25.

The frame 5 has a partial outer bottom surface 39 serving as an outer bottom surface corresponding to a surface disposed opposite to the portion of the inner bottom surface 32 overlapping the protrusion 15 (that is, the surface disposed opposite to the liquid crystal panel). The partial outer bottom surface 39 overlaps the protrusion 15 in plan view. Obviously, the frame 5 has, in addition to this partial outer bottom surface, another outer bottom surface disposed in correspondence with the portion of the inner bottom surface 32 overlapping the display area B in plan view.

As shown in FIGS. 1 and 2, the flexible board 3 is such that the body 22 electrically connected to the external terminal 19 at the first substrate 8, for example, extends from the recess portion 38a at the upper side of the third side wall recess 38 to the outer side of the frame 5, then along the recess portion 38c at the outer side of the third side wall recess 38, and then along the bottom of the frame from the recess portion 38b at the lower side of the third side wall recess 38 so as to cover the opening 40. The end of the body 22 is adhered to the surface disposed opposite to the inner bottom surface 32. Obviously, the body 22 is also adhered to other contact surfaces defining, for example, the third side wall recess 38.

As shown in, for example, FIGS. 1 and 3, the right branch 23 extending from the body 22 extends from the recess portion 37b disposed opposite to the upper side of the second side wall recess 37 to the outer side of the frame 5 and along the recess portion 37c at the outer side of the second side wall recess 37 and is adhered thereto.

The right branch 23 adhered to the recess portion 37c extends back within the frame 5 from the recess portion 37a and is adhered to a second area D which is a portion of the surface of the protrusion 15 (non-display area C) adjacent to the second side wall 34.

An end of the right branch 23 extends outward from the frame 5 by extending over the body 22 from the recess portion 38a. For example, this end is electrically connected to an external circuit (not shown) with, for example, a connector.

For example, the light-shielding member 6 has a double-faced adhesive sheet adhered to a film base comprising a film such as a polyethylene terephthalate (PET) film subjected to black printing. As shown in FIGS. 1 and 2, the light-shielding member 6 covers the right branch 23 adhered to the display-side surface of the protrusion 15, and is disposed at and adhered to the protrusion 15 so as to cover substantially the entire surface of the protrusion 15 including a first area E corresponding to a portion of the surface of the protrusion 15 adjacent to the first side wall 33.

As shown in FIG. 1, the light-shielding member 6 adhered to the protrusion 15 extends to the recess portion 36a from the display-side surface of the protrusion 15, then along the recess portion 36c at the outer side of the first side wall recess 36, then around the partial outer bottom surface 39 of the frame 5 from the recess portion 36b opposite to the upper side of the first side wall recess 36, and is adhered to the partial outer bottom surface 39. Obviously, the light-shielding member 6 may extend to the body 22 of the flexible board 3 from the partial outer bottom surface 39 and may finally be adhered to the surface of the body 22. This links the flexible board 3 and the light-shielding member 6 into one in order to more firmly secure the frame 5 and the liquid crystal panel 2, thereby making it possible to prevent the flying out and displacement of the liquid crystal panel 2 from the frame 5.

Although, as shown in FIGS. 2 and 3, the opening 40 is substantially rectangular, it may be, for example, a hole or a notch or a cut portion in the bottom surface (inside bottom surface) facing the flexible board of the frame 5, formed in correspondence with the light source 24.

Although the upper sides, the lower sides opposite thereto, and the outer sides of the first side wall recess 36, the second side wall recess 37, and the third side wall recess 38 are recessed substantially in correspondence with the thickness and the width of the right branch 23 and the body 22, they may be formed with sizes that are slightly larger than the thickness and the width of the right branch 23 and the body 22. This makes it possible to compensate for slight errors.

It is desirable that the portions of the first and second side walls 33 and 34 overlapping the light-shielding member 6 and the flexible board 3 be partly cut so that a step is not formed between the display surface of the liquid crystal panel 2 and the upper surfaces of the side walls. This makes it possible to prevent the flexible board 3 and the light-shielding member 6 serving as an adhesion base from being raised from the surface of, for example, the protrusion 15 of the liquid crystal panel 2.

Method of Producing Liquid Crystal Device

Next, a method of producing the liquid crystal device 1 having the above-described structure will be described while focusing on the steps of adhering the flexible board 3 and the light-shielding member 6 to the liquid crystal panel 2 and the frame 5.

Figure 4:
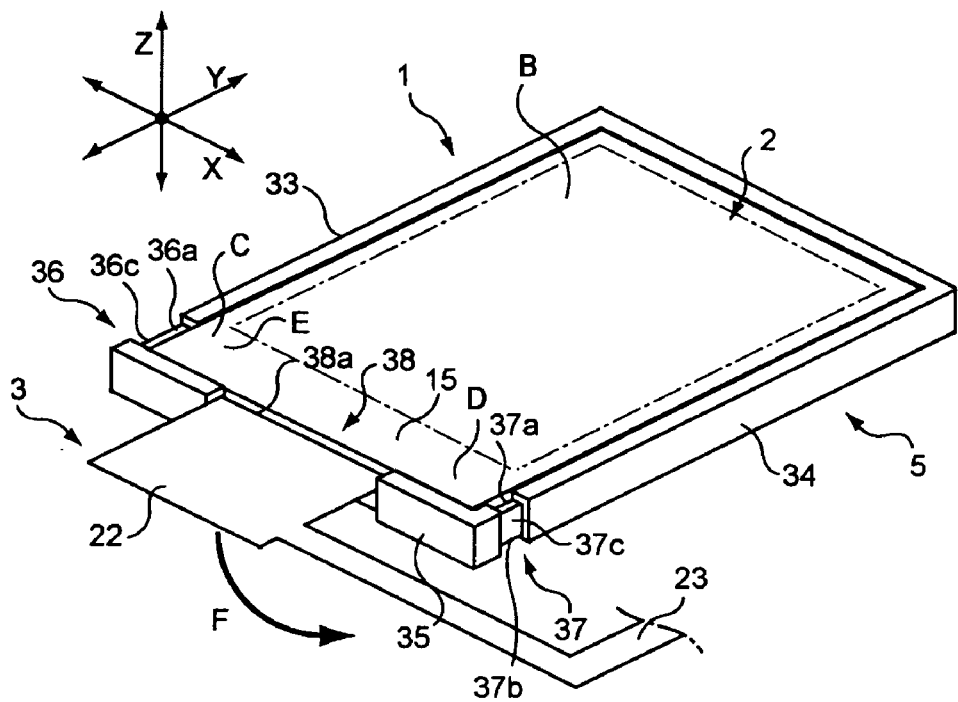
FIG. 4 shows a state in which an illuminator and a liquid crystal panel are accommodated in a frame.
Figure 5:
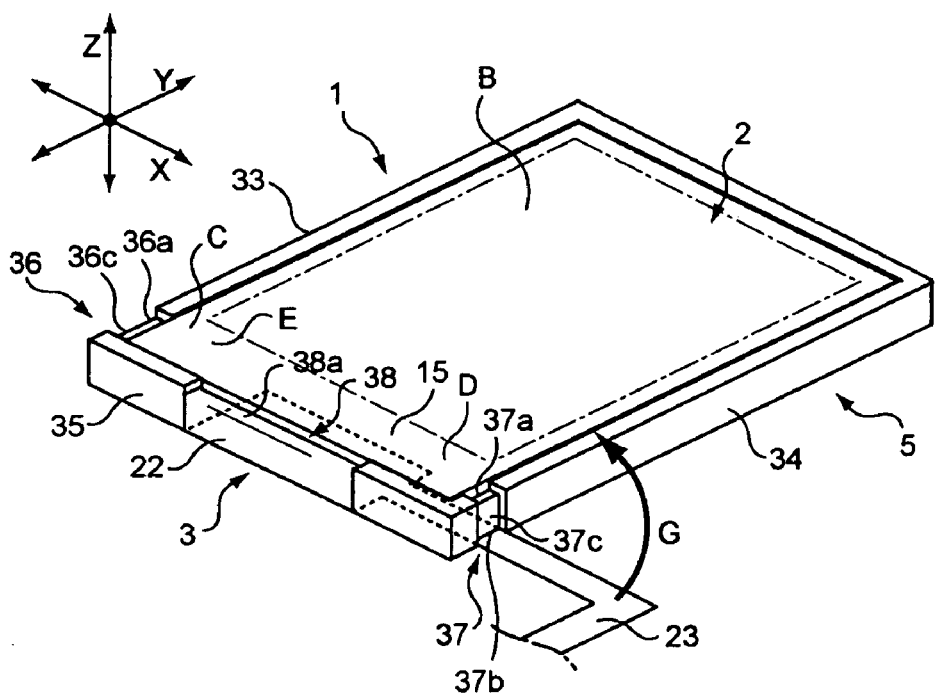
FIG. 5 shows a state in which a body of a flexible board is bent.
Figure 6:
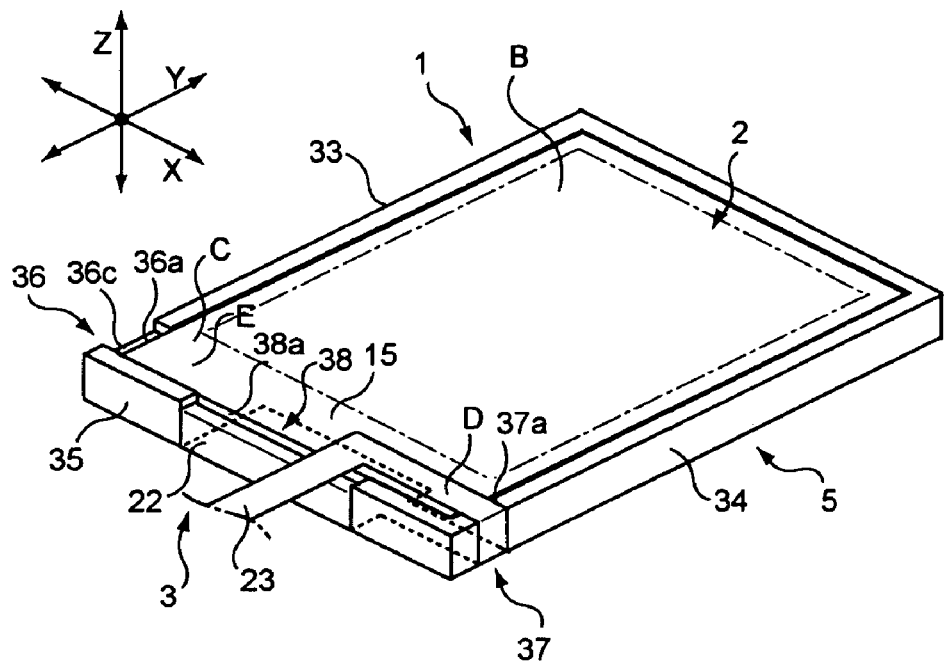
FIG. 6 shows a state in which a right branch of the flexible board is bent.
Figure 7:
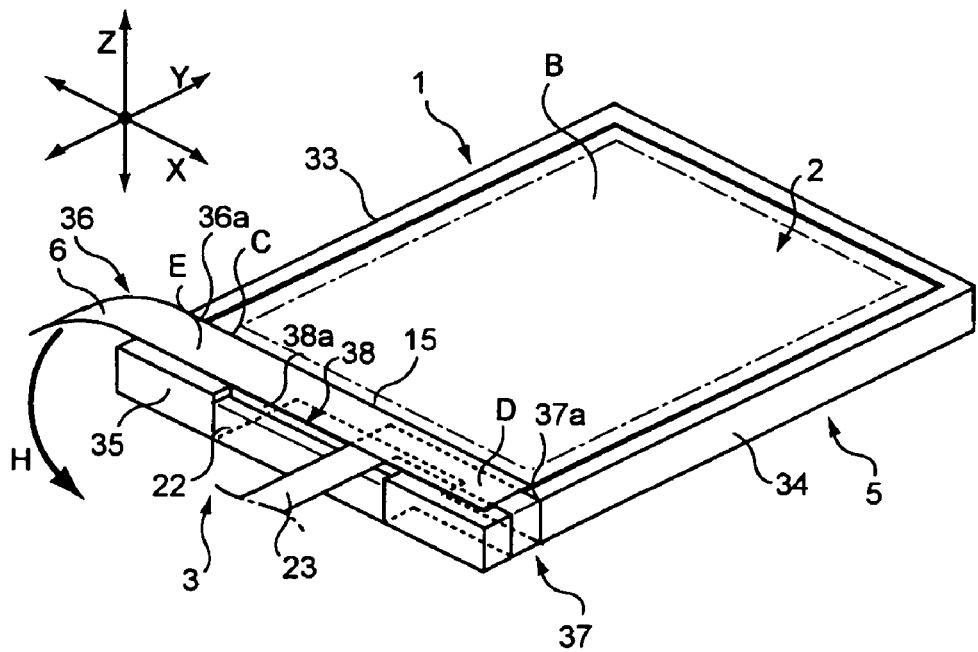
FIG. 7 shows a state in which a light-shielding member is adhered to a protrusion.

FIG. 4 shows a state in which the illuminator and the liquid crystal panel are accommodated in the frame. FIG. 5 shows a state in which the body of the flexible board is bent. FIG. 6 shows a state in which the right branch of the flexible board is bent. FIG. 7 shows a state in which the light-shielding member is adhered to the protrusion.

First, the liquid crystal panel 2 and the illuminator 4 are produced and prepared by a generally known method.

Next, as shown in FIG. 4, the reflective sheet 29 of the illuminator 4 is adhered to the inner bottom surface 32 of the frame 5 with a double-faced adhesive sheet (not shown), and the first substrate of the liquid crystal panel 2 is disposed above this, so that the illuminator 4 and the liquid crystal panel 2 are accommodated in the recess 31 in the frame 5.

Here, as shown in FIG. 4, the body 22 of the flexible board 3 electrically connected to the external terminal 19 at the second substrate 9 via ACF (not shown) is temporarily removed from the frame 5 from the upper recess portion 38a of the third side wall recess 38.

The body 22 having the right branch 23 protruding out of the frame 5 is bent in the direction of arrow F shown in FIG. 4 and an end of the body 22 is disposed under the frame 5 from the lower recess portion of the third side wall recess 38 of the frame 5. Then, as shown in FIGS. 2 and 5, while covering the opening 40, the light source 24 mounted to the body 22 is inserted into the opening 40 and set at the light-receiving surface of the light guide plate 25. Then, the end of the body 22 is adhered to an end of a surface opposite to the inner bottom surface 32 of the frame 5 with a double-faced adhesive sheet (not shown).

Here, as shown in FIG. 5, the right branch 23 extending from the right side of the body 22 is adhered to a portion of the partial outer bottom surface 39 adjacent to the second side wall recess 37 and is brought out of the frame 5 from the lower recess portion 37b of the second side wall recess 37.

The right branch 23 that has been brought out of the frame 5 is bent in the direction of arrow G shown in FIG. 5 and is adhered to the outer recess portion 37c of the second side wall recess 37. Then, the right branch 23 is bent at the upper recess portion 37a of the second side wall recess 37 and returns within the frame 5 as shown in FIG. 6. Thereafter, the right branch 23 is adhered to a portion of the surface of the protrusion 15 at the display side of the second substrate 9. An end of the right branch 23 extends over the body 22 from the upper recess portion 38a of the third side wall recess 38, and is brought out of the frame 5. A connector may be provided at the end of the right branch 23 in order to connect the end to an external device.

For example, as shown in FIG. 7, the light-shielding member 6 is disposed at and adhered to substantially the entire surface of the protrusion 15 so as to cover the right branch 23 adhered to the display-side surface of the protrusion 15.

Next, as shown in FIG. 7, the light-shielding member 6 adhered to the protrusion 15 is extended to the upper recess portion 36a of the first side wall recess 36 from the display-side surface of the protrusion 15, then along the outer recess portion 36c (not shown) of the first side wall recess 36 in the direction of arrow H in the figure, then under the partial outer bottom surface 39 of the frame 5 from the recess 36b (not shown) opposite to the upper side of the first side wall recess 36, and is adhered to the partial outer bottom surface 39 as shown in FIG. 1. Obviously, the light-shielding member 6 may be further extended to the body 22 of the flexible board 3 from the partial outer bottom surface 39 and finally adhered to the surface of the body 22. This links the flexible board 3 and the light-shielding member 6 into one in order to more firmly secure the frame 5 and the liquid crystal panel 2, thereby making it possible to prevent the flying out and displacement of the liquid crystal panel 2 from the frame 5.

This ends the description of the method of producing the liquid crystal device 1.

According to the embodiment, since an adhesion base, such as the light-shielding member 6, is continuously adhered to, for example, the protrusion 15 corresponding to the non-display area C of the liquid crystal device 1 and to the frame 5 holding, for example, the liquid crystal panel 2, it is possible to prevent the liquid crystal panel 2 from flying out of or becoming displaced from the frame 5 due to, for example, shock applied to the frame 5. In addition, since the light-shielding member 6 is adhered to the non-display area of the liquid crystal panel 2, it is possible to prevent the light-shielding member 6 from hindering the display of the liquid crystal device 1.

If the light-shielding member 6 is used as the adhesion base, even when, for example, the liquid crystal driving IC 18 is mounted to the protrusion 15, light propagating to the liquid crystal driving IC 18 is intercepted, so that it is possible to prevent malfunctioning of the liquid crystal driving IC 18 caused by light. In addition, the light-shielding member 6 can prevent, for example, the flying out and displacement of the liquid crystal panel 2 from the frame 5. Since the light-shielding member 6 is used to, for example, prevent the flying out of, for example, the liquid crystal panel, an additional part is not required, thereby reducing costs. Further, since the adhesion of the adhesion member can be achieved by a related step of adhering the light-shielding member 6, the number of steps is not increased.

Since the light-shielding member 6 is extended over substantially the entire surface of the protrusion from the first side wall 33 and the first area E so as to overlap the flexible board 3 adhered to the second area D of the protrusion 15 from the second side wall 34, the flexible board 3 is also firmly secured with the light-shielding member 6. Since the light-shielding member 6 covers the liquid crystal panel 2 such that at least substantially the entire surface of the protrusion is covered from the first area E to the second area D in the non-display area, the light-shielding effect of the light-shielding member 6 is increased.

Since the right branch 23 of the flexible board 3 is bend around the second area D from the outer side of the second side wall of the frame 5 and the light-shielding member 6 is adhered to the first area E and the first side wall 33 of the frame 5, it is possible to prevent, for example, the flying out of the electro-optical panel by the light-shielding member 6 and the flexible board 3. In addition, if the light-shielding member 6 is made slightly larger and adhered to the protrusion 15 (non-display area), it is possible to prevent, for example, the liquid crystal driving IC that is mounted from malfunctioning due to light.

Since the light-shielding member 6 is extended to the partial outer bottom surface 39 of the frame 5, it is possible to further prevent, for example, the flying out and displacement of the liquid crystal panel 2 from the frame 5 by increasing the adhesion area of the frame 5 and the light-shielding member 6 serving as the adhesion base.

Since the body 22 can be held down toward and secured to the liquid crystal panel 2 with the adhesion base, such as the light-shielding member 6, adhered to a side opposite to the side where the light source 24 at the body 22 is mounted, it is possible to prevent the light source 24 from being vertically displaced from the light guide plate 25 caused by the body 22 being raised from the light guide plate 25 secured to the liquid crystal panel 2. Therefore, light emitted from the light source 24 can reliably impinge upon the light guide plate 25.

First Modification

A first modification of the first embodiment of the liquid crystal device in accordance with the invention will be described. The first modification differs from the first embodiment in that a light-shielding member is not used and that branches of the flexible board are adhered to respective sides of a frame. Therefore, the modification will be described by focusing on these two points. Parts that are common to those in the first embodiment will be given the same reference numerals and will not be described below.

Figure 8:
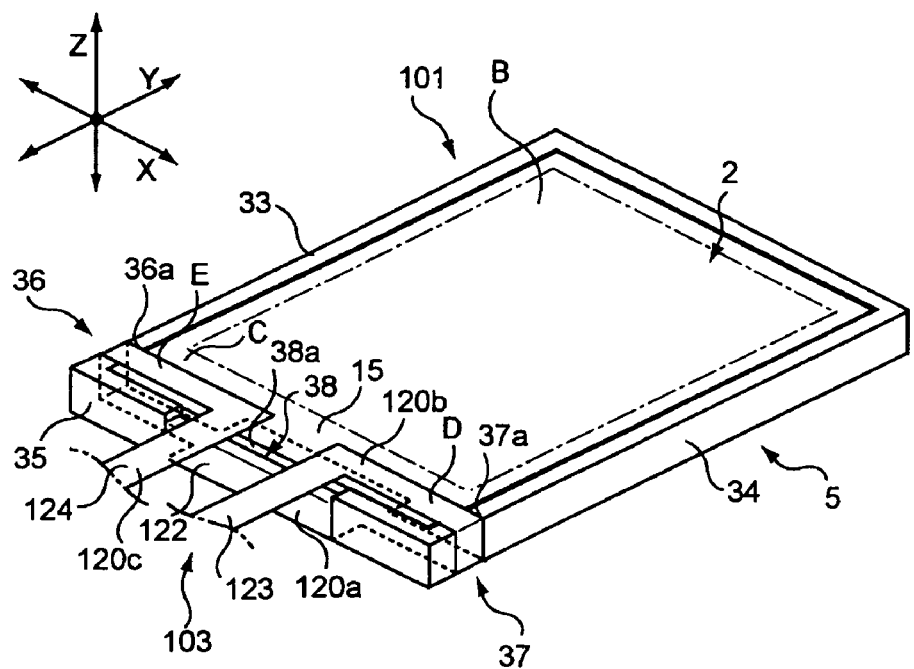
FIG. 8 is a schematic perspective view of a liquid crystal device in accordance with a first modification.

FIG. 8 is a schematic perspective view of a liquid crystal device in accordance with the first modification.

As shown in FIG. 8, a liquid crystal device 101 comprises, for example, a liquid crystal panel 2, a flexible board 103 serving as a flexible circuit board electrically connected to the liquid crystal panel 2, an illuminator 4 (not shown) for illuminating the liquid crystal panel 2 with light, and a frame 5 holding the liquid crystal panel 2 and the illuminator 4. Here, supplemental mechanisms (not shown) other than the frame 5 are provided in the liquid crystal device 101 as required.

As shown in FIG. 8, in the flexible board 3, wiring patterns 121 (comprising wiring patterns 121a, 121b, and 121c) and electronic components such as a capacitor or an IC or a light source 24 (not shown) are mounted on bases 120 (comprising bases 120a, 120b, and 120c). Here, the bases 120 are flexible films and the wiring patterns 121 are formed of, for example, copper. Although not shown, a double faced adhesive sheet is adhered to, for example, the surface of the flexible board 103 secured to, for example, the frame 5.

The flexible board 103 also includes a body 122 and a right branch 123 and a left branch 124 (the branches serving as extending portions extending from the body 122 towards a protrusion 15 in FIG. 8). The right branch 123 and the left branch 124 are electrically connected to an external circuit (not shown).

A body connection terminal (not shown) is formed at an end of the body 122 adjacent the liquid crystal panel, and is electrically connected to an external terminal 19 at the liquid crystal panel 2 via an anisotropic conductive film (ACF) (not shown).

As shown in FIG. 8, as in the first embodiment, the body 122 extends from a recess portion 38a at the upper side of a third side wall recess 38 of the frame 5 to the outer side of the frame 5, then to a recess portion at the outer side of the third side wall recess 38, and then along the bottom of the frame 5 from a recess portion at the lower side of the third side wall recess 38 so as to cover an opening 40 (not shown). The body 22 is adhered to the surface disposed opposite to an inner bottom surface 32 (not shown) of the frame 5.

As shown in FIG. 8, the right branch 123 extends from the right side of the body 122. A portion of the wiring pattern 121a disposed on the base 120a of the body 122 is electrically connected to the wiring pattern 121b disposed on the base 120b of the right branch.

As shown in FIG. 8, the right branch 123 extends out of the frame 5 from a lower recess portion opposite to the upper side of a second side wall recess 37 and is bent, then extends along a recess portion at the outer side of the second side wall recess 37, then returns into an upper recess portion of the second side wall recess 37, and is adhered to a second area D of the protrusion 15, serving as a non-display area of the liquid crystal panel 2. The right branch 123 adhered to the second area D extends over the body 122 from the upper recess portion 38a of the third side wall recess 38 and out of the frame 5.

As shown in FIG. 8, the left branch 124 extends from the left side of the body 122. A portion of the wiring pattern 121a disposed on the base 120a of the body 122 is electrically connected to the wiring pattern 121c disposed on the base 120c of the left branch.

As shown in FIG. 8, the left branch 124 extends out of the frame 5 from a lower recess portion opposite to the upper side of a first side wall recess 36 and is bent, then extends along a recess portion at the outer side of the first side wall recess 36, then returns within the frame from an upper recess portion 36a of the first side wall recess 36, and is adhered to a first area E of the protrusion 15, serving as a non-display area of the liquid crystal panel 2. The left branch 124 adhered to the first area E extends over the body 122 from the upper recess portion 38a of the third side wall recess 38 and out of the frame 5.

In the modification, the first side wall recess 36 has a recess portion which is formed in the upper surface of the first side wall 33 facing the display side and which extends in the direction of the bottom surface from the upper surface near the protrusion 15 so as to be recessed substantially in correspondence with the thickness of the left branch 124. The breadth of the recess portion is in correspondence with the width of the left branch 124.

The first side wall recess 36 also has a recess portion disposed opposite to the upper recess portion and extending from the bottom surface to the upper surface so as to be recessed in correspondence with the thickness of the left branch 124. The breadth of the recess portion is in correspondence with the width of the left branch 124.

The first side wall recess 36 also has a recess portion extending inward from the outer surface disposed between the upper and lower recess portions. The recess portion is recessed in correspondence with the thickness of the left branch 124. The breadth of the recess portion is in correspondence with the width of the left branch 124. Accordingly, adhesion of the left branch 124 makes it possible to prevent the left branch 24 from protruding from the first side wall 33 of the frame 5 in order to reduce the size of the liquid crystal device 1 and facilitate the positioning of the left branch 124.

Although the upper sides, the lower sides opposite thereto, and the outer sides of the first side wall recess 36, the second side wall recess 37, and the third side wall recess 38 are recessed substantially in correspondence with the thickness and the width of the left branch 124, the right branch 123 and the body 122, they may be formed with sizes that are slightly larger than the thickness and the width of the left branch 124, the right branch 123, and the body 22. This makes it possible to compensate for slight errors.

It is desirable that the portions of the first and second side walls 33 and 34 overlapping the flexible board 103 be partly cut so that a step is not formed between the display surface of the liquid crystal panel 2 and the upper surfaces of the side walls. This makes it possible to prevent the flexible board 103 (adhesion base) from being raised from the surface of, for example, the protrusion 15 of the liquid crystal panel 2.

Since the flexible board 103 is continuously adhered to the first side wall 33 of the frame 5 and a first area E adjacent to the first side wall 33 and to the second side wall 34 of the frame 5 and a second area D adjacent to the second side wall 34, the liquid crystal panel 2 is firmly secured in the recess 31 of the frame 5, thereby making it possible to prevent the flying out and displacement of the liquid crystal panel 2 from the frame 5.

Since the existing flexible board 103 is used, an additional part is not required, thereby making it possible to reduce manufacturing costs. In addition, since, for example, the liquid crystal panel is secured at the same time by carrying out the hitherto required step of mounting the flexible board 103, an additional step is not required, so that the liquid crystal panel 2 can be prevented from flying out of and becoming displaced from the frame 5. Here, at least one of the branches of the flexible board 103 may have a light-shielding property and may overlap a liquid crystal driving IC 18 so as to act as a light-shielding member. Alternatively, a separate light-shielding member may be provided for light shielding. In this case, if the light-shielding member is adhered to the branches and the protrusion 15 so as to cover the branches of the flexible board 103, the flexible board 103 and the liquid crystal panel 2 can be firmly secured to the frame 5. In addition, if the branches of the flexible board 103 are adhered to the light-shielding member and the protrusion 15 so as to cover the light-shielding member, the light-shielding member and the liquid crystal panel 2 can be more firmly secured to the frame 5.

Second Modification

A second modification of the first embodiment of the liquid crystal device in accordance with the invention will be described. The second modification differs from the first embodiment in that a light-shielding member is adhered to both sides of a frame and a flexible board is not adhered to a side surface of the frame. Therefore, the modification will be described by focusing on these two points. Parts that are common to those in the first embodiment will be given the same reference numerals and will not be described below.

Figure 9:
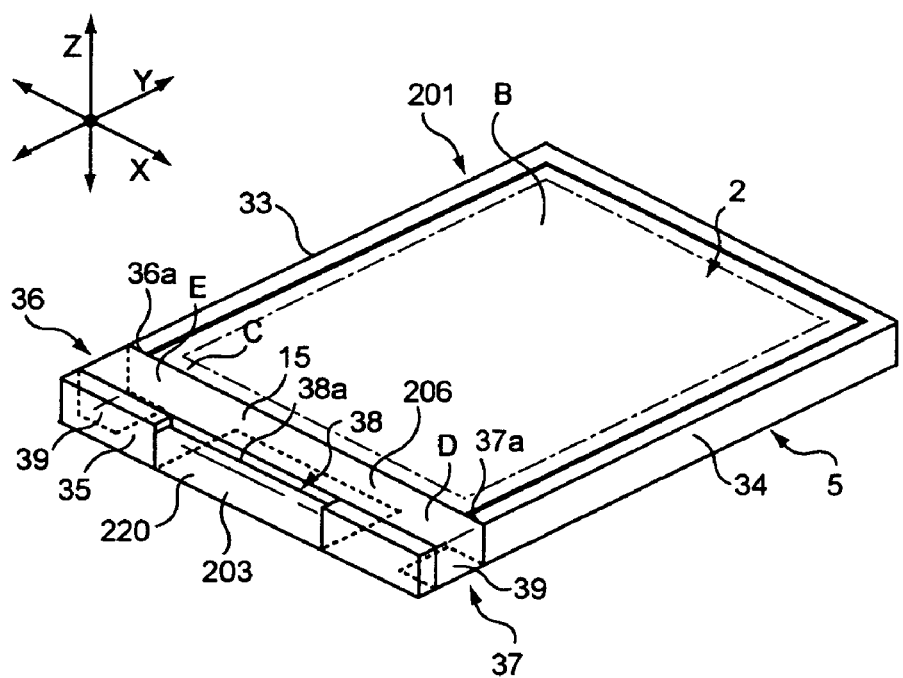
FIG. 9 is a schematic perspective view of a liquid crystal device in accordance with a second modification.

FIG. 9 is a schematic perspective view of a liquid crystal device in accordance with the second modification.

As shown in FIG. 9, a liquid crystal device 201 comprises, for example, a liquid crystal panel 2, a flexible board 203 serving as a flexible circuit board electrically connected to the liquid crystal panel 2, an illuminator 4 (not shown) for illuminating the liquid crystal panel 2 with light, a frame 5 holding the liquid crystal panel 2 and the illuminator 4, and a light-shielding member 206. Here, supplemental mechanisms (not shown) other than the frame 5 are provided in the liquid crystal device 201 as required.

As shown in FIG. 9, in the flexible board 203, a wiring pattern 221 (not shown) and electronic components such as a capacitor or an IC or a light source 24 (not shown) are mounted on a base 220. Here, the base 220 is a flexible film and the wiring pattern 221 is formed of, for example, copper. Although not shown, a double faced adhesive sheet is adhered to, for example, the surface of the flexible board 103 secured to, for example, the frame 5.

A connection terminal (not shown) is formed at an end of the flexible board 203 adjacent the liquid crystal panel, and is electrically connected to an external terminal 19 at the liquid crystal panel 2 via an anisotropic conductive film (ACF) (not shown).

As shown in FIG. 9, as in the first embodiment, the flexible board 203 extends from a recess portion 38a at the upper side of a third side wall recess 38 of the frame 5 to the outer side of the frame 5, then to a recess portion at the outer side of the third side wall recess 38, and then along the bottom of the frame 5 from a recess portion at the lower side of the third side wall recess 38 so as to cover an opening 40. An end of the flexible board 203 is adhered to the surface disposed opposite to an inner bottom surface 32 (not shown) of the frame 5.

For example, the light-shielding member 206 has a double-faced adhesive sheet adhered to a film base comprising a film such as a polyethylene terephthalate (PET) film subjected to black printing. As shown in FIG. 9, the light-shielding member 206 is adhered to a portion of a partial outer bottom surface 39 adjacent a first side wall recess 36. From the partial outer bottom surface 39, the light-shielding member 206 extends to a recess portion at the lower side of the first side wall recess 36 opposite to the upper side of the first side wall recess 36. From the lower recess portion, the light-shielding member 206 extends out of the frame 5 and along a recess portion at the outer side of the first side wall recess 36, and returns within the frame 5 from a recess portion 36a at the upper side of the first side wall recess 36 and is adhered to a first area E adjacent to the first side wall 33.

As shown in FIG. 9, the light-shielding member 206 adhered to the first area E substantially covers a protrusion 15, is adhered to a second area D adjacent to a second side wall 34, is bent outward from the frame from a recess portion 37a at the upper side of a second side wall recess 37, extends along a recess portion at the outer side of the second side wall recess 37, and returns to the bottom of the frame from a recess portion at the lower side of the second side wall recess 37 opposite to the upper side of the second side wall recess 37.

The portion of the light-shielding member 206 at the bottom of the frame 5 is adhered to a portion of the partial outer bottom surface 39 adjacent to the second side wall recess 37. Obviously, the light-shielding member 206 may be further extended to the flexible board 3 from the partial outer bottom surface 39 and finally adhered to the surface of the flexible board 203.

In the modification, the second side wall recess 37 has a recess portion which is formed in the upper surface of the second side wall 34 facing the display side and which extends in the direction of the bottom surface from the upper surface near the protrusion 15 so as to be recessed substantially in correspondence with the thickness of the light-shielding member 206. The breadth of the recess portion is in correspondence with the width of the light-shielding member 206.

The second side wall recess 37 also has a recess portion disposed opposite to the upper recess portion 37a and extending from the bottom surface to the upper surface so as to be recessed substantially in correspondence with the thickness of the light-shielding member 206. The breadth of the recess portion is in correspondence with the width of the light-shielding member 206.

The second side wall recess 37 also has a recess portion extending inward (that is, in a direction opposite to that of the first side wall recess) from the outer surface disposed opposite to the outer surface defining the first side wall recess and disposed between the upper and lower recess portions. The recess portion is recessed in correspondence with the thickness of the light-shielding member 206. The breadth of the recess portion is in correspondence with the width of the light-shielding member 206. Accordingly, adhesion of the light-shielding member 206 makes it possible to prevent the light-shielding member 206 from protruding from the second side wall 34 of the frame 5 in order to reduce the size of the liquid crystal device 1 and facilitate the positioning of the light-shielding member 206.

Although the upper sides, the lower sides opposite thereto, and the outer sides of the first side wall recess 36, the second side wall recess 37, and the third side wall recess 38 are recessed substantially in correspondence with the thickness and the width of the light-shielding member 206 and the flexible board 203, they may be formed with sizes that are slightly larger than the thickness and the width of the light-shielding member 206 and the flexible board 203. This makes it possible to compensate for slight errors.

It is desirable that the portions of the first and second side walls 33 and 34 overlapping the light-shielding member 206 be partly cut so that a step is not formed between the display surface of the liquid crystal panel 2 and the upper surfaces of the side walls. This makes it possible to prevent the light-shielding member 206 serving as an adhesion base from being raised from the surface of, for example, the protrusion 15 of the liquid crystal panel 2.

Accordingly, the light-shielding member 206 is adhered to the portion of the partial outer bottom surface 39 adjacent to the first side wall recess 36 of the frame 5, is extended along the first side wall recess 36 and adhered thereto, is adhered to the first area E and the second area D of the protrusion 15, is extended continuously along the second side wall recess 37 and adhered thereto, and is adhered to the portion of the partial outer bottom surface 39 adjacent the second side wall recess 37. Therefore, the liquid crystal panel 2 is firmly secured in the recess 31 of the frame 5 with the light-shielding member 206, thereby making it possible to prevent, for example, the flying out of and displacement of the liquid crystal panel 2 from the frame 5. In addition, since the light-shielding member 206 substantially covers the protrusion 15, it is possible to prevent a liquid crystal driving IC 18 mounted to the protrusion 15 from malfunctioning due to light.

Since an existing light-shielding member is used, an additional part is not required, thereby making it possible to reduce manufacturing costs. In addition, since, for example, the liquid crystal panel 2 can be secured by carrying out the related step of adhering a light-shielding member, an additional step is not required.

Since the light-shielding member 206 is adhered to the side surfaces of the frame 5 and the portions of the partial outer bottom surface at both sides of the frame 5, it is possible to increase the adhesion area of the light-shielding member 206 in order to further prevent, for example, the liquid crystal panel 2 from flying out of the frame.

Third Modification

A third modification of the first embodiment of the liquid crystal device in accordance with the invention will be described. The third modification differs from the first and second modifications in that it is a combination of the first and second modifications. Therefore, the modification will be described by focusing on this point. Parts that are common to those in the first embodiment and the first and second modifications will be given the same reference numerals and will not be described below.

Figure 10:
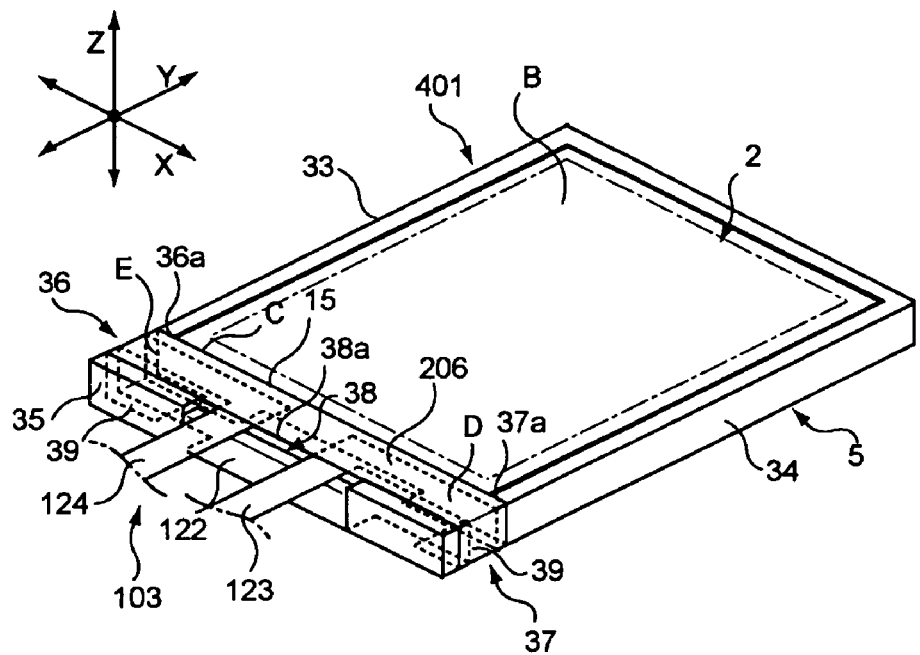
FIG. 10 is a schematic perspective view of a liquid crystal device in accordance with a third modification.

FIG. 10 is a schematic perspective view of a liquid crystal device in accordance with the third modification.

As shown in FIG. 10, a liquid crystal device 401 comprises, for example, a liquid crystal panel 2, a flexible board 103 serving as a flexible circuit board electrically connected to the liquid crystal panel 2, an illuminator 4 (not shown) for illuminating the liquid crystal panel 2 with light, a frame 5 holding the liquid crystal panel 2 and the illuminator 4, and a light-shielding member 206. Here, supplemental mechanisms (not shown) other than the frame 5 are provided in the liquid crystal device 401 as required.

Here, as shown in FIG. 10, adhesion of the light-shielding member 206 is started while covering a right branch 123 from near a portion of a partial outer bottom surface 39 adjacent to a second side wall recess 37. The light-shielding member 206 is extended to the portion of the right branch 123 adhered along the second side wall recess 37, covers the portion of the right branch 123 adhered to a second area D of a protrusion 15, and is adhered to the right branch 123 and the surface of the protrusion 15 extending from the right branch 123.

As shown in FIG. 10, the light-shielding member 206 further extends from the location of the portion of the right branch 123 adhered to the second area D, covers a left branch 124 adhered to a first area E of the protrusion 15, and is adhered to the left branch 124 and the surface of the protrusion 15 extending from the left branch 124. In addition, the light-shielding member 206 extends to the portion of the left branch 124 adhered along a first side wall recess 36 and, while covering the left branch 124 to a location near the portion of the partial outer bottom surface 39 adjacent the first side wall recess 36, is adhered. Obviously, the light-shielding member 206 may extend to a body 122 of the flexible board 103 from the partial outer bottom surface 39 and may finally be adhered to the surface of the body 122.

Accordingly, the liquid crystal panel 2 and the frame 5 are secured to each other from both sides with the right branch 123 and the left branch 124 in order to prevent the flying out of the liquid crystal panel, and this structure is covered with and adhered to the light-shielding member 206 from thereabove. Therefore, it is possible to more reliably prevent, for example, the flying out of and displacement of the liquid crystal panel 2 from the frame 5. In addition, since the existing step of adhering the light-shielding member 206 may be used for securing the liquid crystal panel 2, manufacturing costs can be reduced.

Since substantially the entire surface of the protrusion 15, which is a non-display area, is covered with the light-shielding member 206, electronic parts, such as a liquid crystal driving IC 18, mounted to the protrusion 15 can be prevented from malfunctioning due to light.

Fourth Modification

A fourth modification of the first embodiment of the liquid crystal device in accordance with the invention will be described. The fourth modification differs from the first embodiment in that a light-shielding member and a flexible board are not adhered to both sides of a frame and inwardly protruding protrusions are disposed at the upper sides of side walls of the frame. Therefore, the modification will be described by focusing on these points. Parts that are common to those in the first embodiment and the second modification will be given the same reference numerals and will not be described below.

Figure 11:
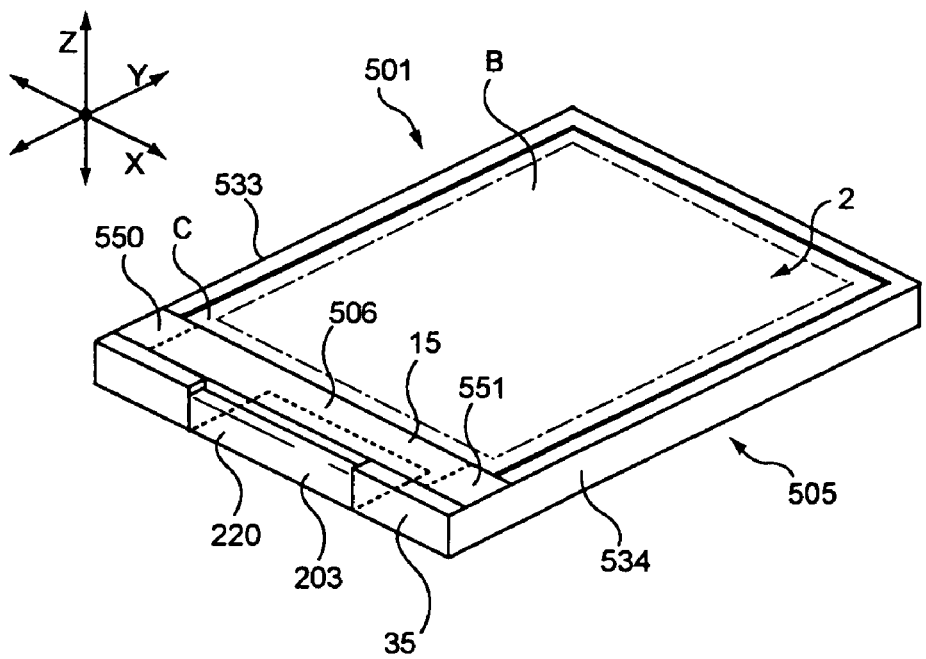
FIG. 11 is a schematic perspective view of a liquid crystal device in accordance with a fourth modification.

FIG. 11 is a schematic perspective view of a liquid crystal device in accordance with the fourth modification.

As shown in FIG. 11, a liquid crystal device 501 comprises, for example, a liquid crystal panel 2, a flexible board 203 serving as a flexible circuit board electrically connected to the liquid crystal panel 2, an illuminator 4 (not shown) for illuminating the liquid crystal panel 2 with light, a frame 505 holding the liquid crystal panel 2 and the illuminator 4, and a light-shielding member 506. Here, supplemental mechanisms (not shown) other than the frame 505 are provided in the liquid crystal device 501 as required.

Here, as shown in FIG. 11, in the frame 505, a first side wall 533 and a second side wall 534 do not have a first side wall recess and a second side wall recess, respectively, unlike the first embodiment. Instead, an inwardly protruding substantially rectangular protrusion 550 is disposed at the upper surface of the first side wall 533 so as to cover a portion of a protrusion 15. Similarly, an inwardly protruding substantially rectangular protrusion 551 is disposed at the upper surface of the second side wall 534.

For example, the light-shielding member 506 has a double-faced adhesive sheet adhered to a film base comprising a film such as a polyethylene terephthalate (PET) film subjected to black printing. As shown in FIG. 11, the light-shielding member 506 continuously covers the protrusion 15 from the surface of the protrusion 550 at the upper surface of the first side wall 533, and is adhered over an area up to the surface of the protrusion 551 at the upper surface of the second side wall 534.

It is desirable that the portions of the first and second side walls 533 and 534 overlapping the light-shielding member 506 be partly cut so that a step is not formed between the display surface of the liquid crystal panel 2 and the upper surfaces of the side walls. This makes it possible to prevent the light-shielding member 506 serving as an adhesion base from being raised from the surface of, for example, the protrusion 15 of the liquid crystal panel 2.

Accordingly, since the protrusions 550 and 551 protrude into the liquid crystal panel 2 so as to cover a portion of the protrusion 15, it is also possible to use the protrusions 550 and 551 to prevent the flying out and displacement of the liquid crystal panel 2 from the frame 505 due to, for example, shock applied to the frame 505.

Although, in the modification, the light-shielding member 506 is only adhered to the upper surfaces of the first and second side walls 533 and 534, the adhesion area of the light-shielding member 506 can be increased in correspondence with the protruding amount of the protrusions 550 and 551. Even if the light-shielding member 506 cannot be adhered to the side surfaces, it is possible to further prevent the flying out and displacement of the liquid crystal panel 2 from the frame 505 by increasing the adhesion area.

Fifth Modification

A fifth modification of the first embodiment of the liquid crystal device in accordance with the invention will be described. The fifth modification differs from the first embodiment in that an opening in a frame is larger and a portion of a body of a flexible board is substantially T-shaped. Therefore, the modification will be described by focusing on these two points. Parts that are common to those in the first embodiment will be given the same reference numerals and will not be described below.

Figure 12:
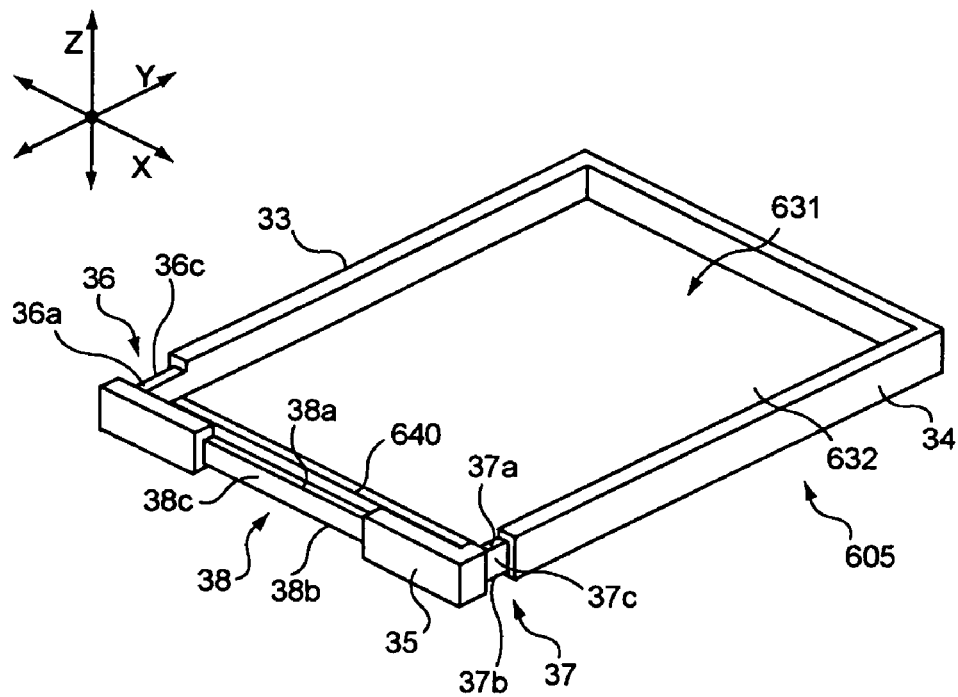
FIG. 12 is a schematic perspective view of a frame in accordance with a fifth modification.
Figure 13:
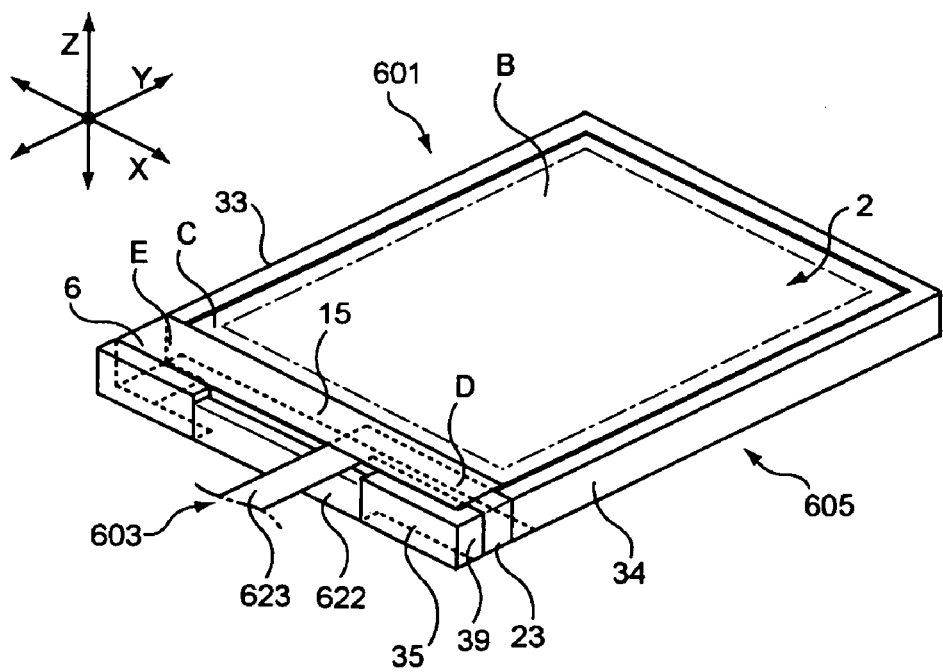
FIG. 13 is a schematic perspective view of a liquid crystal device in accordance with a fifth modification.

FIG. 12 is a schematic perspective view of a frame in accordance with the fifth modification, and FIG. 13 is a schematic perspective view of a liquid crystal device in accordance with the fifth modification.

As shown in FIG. 13, a liquid crystal device 601 comprises, for example, a liquid crystal panel 2, a flexible board 603 serving as a flexible circuit board electrically connected to the liquid crystal panel 2, an illuminator 4 (not shown) for illuminating the liquid crystal panel 2 with light, a frame 605 holding the liquid crystal panel 2 and the illuminator 4, and a light-shielding member 6. Here, supplemental mechanisms (not shown) other than the frame 605 are provided in the liquid crystal device 601 as required.

As shown in FIG. 12, the frame 605 has an opening 640 disposed substantially in correspondence with a protrusion 15 and having substantially the same size as the protrusion 15 so as to overlap the protrusion 15 in plan view. In other words, a recess 631 of the frame 605 has an inner bottom surface 632 excluding a location overlapping the protrusion 15 in plan view. Therefore, unlike the first embodiment, the partial outer bottom surface 39 is not provided. The structures of the first to third side walls, etc., are substantially the same as those in the first embodiment.

The flexible board 603 is such that, for example, wiring patterns and a light source 24 (both of which are not shown) are formed on and mounted to bases (not shown). Here, the bases are flexible films, and the wiring patterns are formed of, for example, copper. Although not shown, a double faced adhesive sheet is adhered to the surface of the flexible board 603 secured to, for example, the frame 605.

As shown in FIG. 13, the flexible board 603 also includes a body 622 and a right branch 623 serving as an extending portion extending from the body 622. The right branch 623 is electrically connected to an external circuit (not shown).

A body connection terminal (not shown) is formed at an end of the body 622 adjacent the liquid crystal panel, and is electrically connected to an external terminal 19 at the liquid crystal panel 2 via an anisotropic conductive film (ACF) (not shown). As shown in FIG. 13, a portion of the body 622 near an end opposite to the body connection terminal is substantially T-shaped, and the portion thereof extending laterally is formed so as to substantially overlap the protrusion 15 in plan view. The laterally extending portion of the substantially T-shaped portion substantially covers the opening in the frame 605.

For example, the right branch 623 extends from the right side of the body 622. A portion of the wiring pattern disposed on the base of the body 622 is electrically connected to the wiring pattern disposed on the base of the right branch 623.

As shown in FIG. 13, the flexible board 603 is such that the body 622 electrically connected to the external terminal 19 at a first substrate 8, for example, extends from a recess portion 38a at the upper side of a third side wall recess 38 to the outer side of the frame 605, then along a recess portion 38c at the outer side of the third side wall recess 38, and then along the bottom of the frame 605 from a recess portion 38b at the lower side of the third side wall recess 38 so as to substantially cover the opening 640. The end of the body 622 is adhered to the surface disposed opposite to the inner bottom surface 632.

As shown in FIGS. 12 and 13, the right branch 623 extending from the body 622 extends from a recess portion 37b disposed opposite to the upper side of a second side wall recess 37 to the outer side of the frame 605 and along a recess portion 37c at the outer side of the second side wall recess 37 and is adhered thereto.

The right branch 623 adhered to the recess portion 37c extends back within the frame 605 from a recess portion 37a at the upper side of the second side wall recess 37 and is adhered to a second area D which is a portion of the surface of the protrusion 15 (non-display area C) adjacent to the second side wall 34.

An end of the right branch 623 extends outward from the frame 605 by extending over the body 622 from the recess portion 38a of the third side wall recess 38. For example, this end is electrically connected to an external circuit (not shown) by, for example, a connector.

For example, the light-shielding member 6 has a double-faced adhesive sheet adhered to a film base comprising a film such as a polyethylene terephthalate (PET) film subjected to black printing. As shown in FIG. 13, the light-shielding member 6 covers the right branch 623 adhered to the display-side surface of the protrusion 15, and is disposed at and adhered to the protrusion 15 so as to cover substantially the entire surface of the protrusion 15 including a first area E corresponding to a portion of the surface of the protrusion 15 adjacent to the first side wall 33.

As shown in FIG. 13, the light-shielding member 6 adhered to the protrusion 15 extends to a recess portion 36a at the upper side of a first side wall recess 36 from the display-side surface of the protrusion 15, then along a recess portion 36c at the outer side of the first side wall recess 36, and then around the bottom of the frame 605 from a recess portion 36b opposite to the upper side of the first side wall recess 36.

As shown in FIG. 13, the light-shielding member 6 extends to the body 622 of the flexible board 3 and is adhered to the surface of the laterally extending portion of the substantially T-shaped portion of the body 622.

Although the upper sides, the lower sides opposite thereto, and the outer sides of the first side wall recess 36, the second side wall recess 37, and the third side wall recess 38 are recessed substantially in correspondence with the thickness and the width of the right branch 623 and the body 622, they may be formed with sizes that are slightly larger than the thickness and the width of the right branch 623 and the body 622. This makes it possible to compensate for slight errors.

It is desirable that the portions of the first and second side walls 33 and 34 overlapping the light-shielding member 6 and the flexible board 603 be partly cut so that a step is not formed between the display surface of the liquid crystal panel 2 and the upper surfaces of the side walls. This makes it possible to prevent the flexible board 603 and the light-shielding member 6 serving as an adhesion base from being raised from the surface of, for example, the protrusion 15 of the liquid crystal panel 2.

The flexible board 603 and the light-shielding member 6 are linked into one in order to more firmly secure the frame 605 and the liquid crystal panel 2, thereby making it possible to prevent the flying out and displacement of the liquid crystal panel 2 from the frame 605.

Since the opening 640 is large, it is possible for the light source 24 to be long (in the X-axis direction in the figures) by disposing, for example, light-emitting diodes (LEDs) in a line.

Second Embodiment

Electronic Apparatus

An electronic apparatus in accordance with a second embodiment including any one of the above-described liquid crystal devices 1, 101, 201, 401, 501, and 601 will be described. Parts in the second embodiment common to those in the first embodiment and the first to fifth modifications will be given the same reference numerals and will not be described below.

Figure 14:
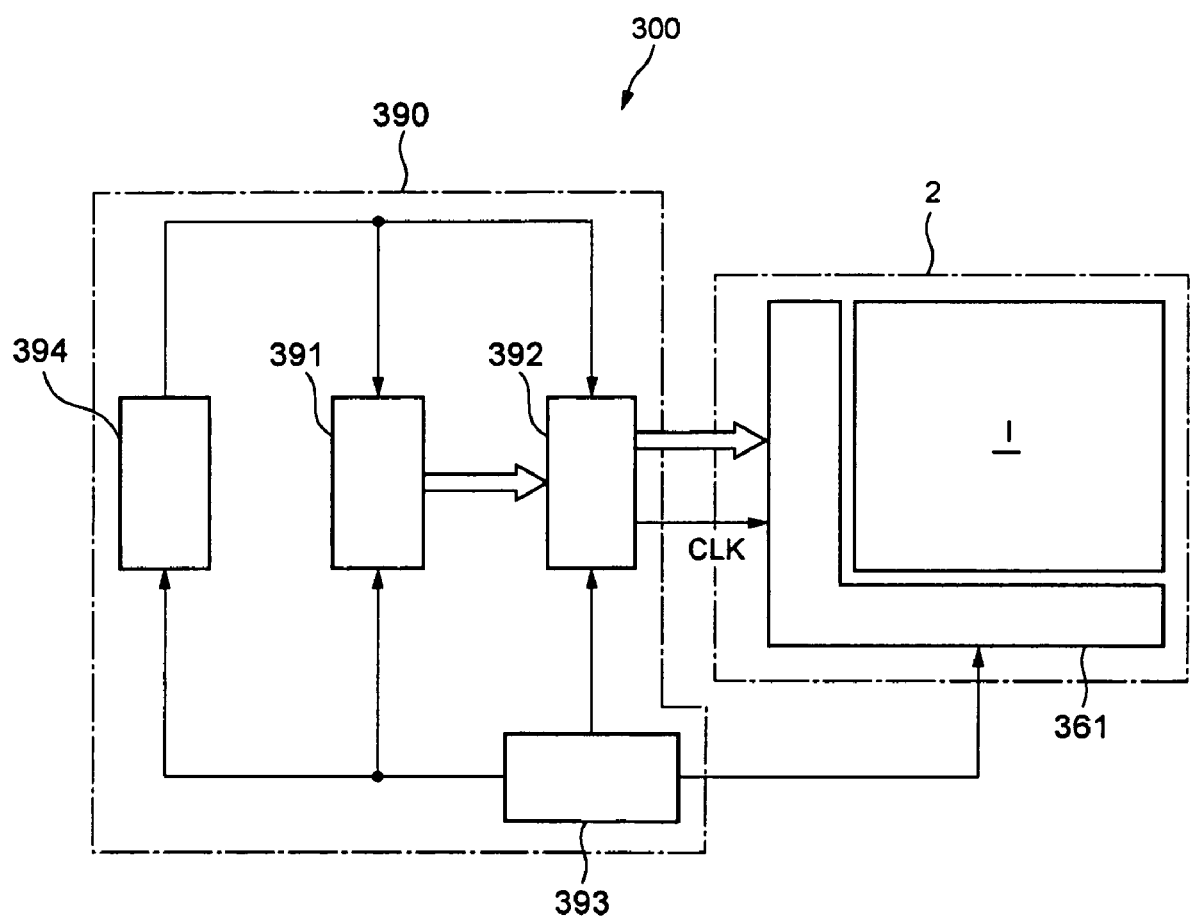
FIG. 14 is a schematic view of the structure of a display control system of an electronic apparatus in accordance with a second embodiment.

FIG. 14 is a schematic view of the entire structure of a display control system of an electronic apparatus in accordance with the second embodiment.

As shown in FIG. 14, an electronic apparatus 300 includes, for example, a display control circuit 390 and the liquid crystal panel 2, which comprise a display control system. The display control circuit 390 comprises, for example, a display information output source 391, a display information processing circuit 392, a power supply circuit 393, and a timing generator 394.

The liquid crystal panel 2 comprises a drive circuit 361 for driving a display area I.

The display information output source 391 includes a memory (such as a read only memory (ROM) or a random access memory (RAM)), a storage unit (such as a magnetic recording disc or an optical recording disc), and a tuning circuit for achieving tuning output of a digital image signal. The display information output source 391 supplies to the display information processing circuit 392 display information in the form of, for example, a predeterminately formatted image signal on the basis of various clock signals generated by the timing generator 394.

The display information processing circuit 392 includes various known circuits such as a serial-parallel converting circuit, an amplifying/inverting circuit, a rotation circuit, a gamma correcting circuit, and a clamping circuit. The display information processing circuit 392 processes the display information input thereto and supplies image information thereof along with a clock signal CLK to the drive circuit 361. The power supply circuit 393 supplies predetermined voltages to the respective parts.

According to the embodiment, in, for example, the liquid crystal device 1 of the electronic apparatus 300, the adhesion base, such as the light-shielding member 6, is continuously adhered over the protrusion 15 (corresponding to the non-display area C) and the frame 5 holding, for example, the liquid crystal panel 2. Therefore, the liquid crystal panel 2 is prevented from flying out of and becoming displaced from the frame 5 due to, for example, shock applied to the frame 5.

Since the existing light-shielding member 6 is slightly extended and used for securing the liquid crystal panel 2, an additional part is not required and the number of manufacturing steps is not increased, thereby reducing manufacturing costs. When, for example, the liquid crystal driving IC is mounted to the protrusion 15, natural light and light emitted from the light source 24 can be intercepted, thereby making it possible to prevent malfunctioning of the liquid crystal driving IC.

In particular, recent electronic apparatuses are required to be small and to provide precise functions. Therefore, this invention is a very significant invention in that it can reliably prevent at a low cost the flying out and displacement of, for example, the liquid crystal panel from the frame due to, for example, external shock.

Specific examples of the electronic apparatus are, in addition to a cellular phone and a personal computer, a touch panel, a projector, a liquid crystal television, a view finder or a monitor direct viewing video tape recorder, a car navigation system, a pager, an electronic notebook, a calculator, a word processor, a work station, a television telephone, and a POS terminal (all of which include a liquid crystal device). It goes without saying that any of the above-described liquid crystal devices 1, 101, 201, 401, 501, and 601 are applicable as display units of the various types of electronic apparatuses.

The electro-optical devices and the electronic apparatuses in accordance with the invention are not limited to the examples mentioned above, so that various modifications may obviously be made within the scope of the invention, that is, without departing from the gist of the invention.

Although the above-described electro-optical devices are all liquid crystal devices each including a liquid crystal panel, they may be, for example, an inorganic or organic electroluminescence device, a plasma display device, an electrophoretic display device, and a device using an electron emitting element (such as a field emission display device or a surface-conduction electron-emitter display device).

Although the invention is described with reference to the preferred embodiments, the invention is not limited thereto, so that modifications may be made as required within the technical ideas of the invention.

Although in the embodiments and the modifications, the liquid crystal devices are passive matrix liquid crystal devices, the invention is not limited thereto, so that the liquid crystal devices may be, for example, thin-film transistor active matrix liquid crystal devices or thin-film diode active matrix liquid crystal devices. In addition, the liquid crystal devices may be transmissive liquid crystal devices instead of semi-transmissive liquid crystal devices. Accordingly, the various liquid crystal devices make it possible to prevent, for example, the liquid crystal panel from, for example, flying out of and becoming displaced from the frame at a low cost and easily without additional parts and increasing the number of steps while preventing malfunctioning of, for example, the liquid crystal driving IC caused by light.

Although, in the embodiments and modifications, the protrusion is disposed at the second substrate 9, the invention is not limited thereto, so that, for example, the protrusion may be disposed at the first substrate 8, and the flexible board and the light-shielding member, serving as an adhesion base, may be continuously adhered to the side surfaces of the frame and the protrusion of the first substrate 8. Accordingly, the various liquid crystal devices make it possible to prevent, for example, the liquid crystal panel from, for example, flying out of and becoming displaced from the frame at a low cost and easily without additional parts and increasing the number of steps while preventing malfunctioning of, for example, the liquid crystal driving IC caused by light.

Although, in the embodiments and modifications, COG for mounting, for example, the liquid crystal driving IC 18 to the protrusion 15 of the second substrate 9 is described, the invention is not limited thereto, so that COF (chip-on-film) for mounting the liquid crystal driving IC to, for example, a circuit board without mounting it to the protrusion is applicable. Accordingly, the various liquid crystal devices make it possible to prevent, for example, the liquid crystal panel from, for example, flying out of and becoming displaced from the frame at a low cost and easily without additional parts and increasing the number of steps.

Although, in the embodiments and modifications, the frame 5 has the first side wall recess 36, the second side wall recess 37, and the third side wall recess 38, the invention is not limited thereto, so that the invention may be applied to a case in which none of these side wall recesses are provided or a case in which one of the side wall recesses, such as the first side wall recess 36, is not provided. Accordingly, this may be achieved in the various liquid crystal devices, so that their manufacturing costs are reduced.

Although, in the embodiments and modifications, for example, the light-shielding member 6 and the right branch 23 are adhered to the first and second side walls 33 and 34 of the frame 5, the invention is not limited thereto, so that the light-shielding member 6 and the right branch 23 may be adhered to, for example, the third side wall 35 or a side wall opposite to the third side wall 35 with the liquid crystal panel 2 being disposed therebetween. Accordingly, the various liquid crystal devices make it possible to prevent, for example, the liquid crystal panel from, for example, flying out of and becoming displaced from the frame at a low cost and easily without additional parts and increasing the number of steps.

What is claimed is:

1. An electro-optical device comprising:
    an electro-optical panel including a display side, a side surface and an other side surface, the display side having a display area and a non-display area extending substantially within the same plane as the display area, the side surface and the other side surface being on opposite sides of the electro-optical panel;
    a frame holding the electro-optical panel and having a first side wall and a second side wall, the first side wall is disposed in correspondence with the side surface of the electro-optical panel, and including an inner surface that faces the side surface of the electro-optical panel and an external surface that does not face the side surface of the electro-optical panel and is opposite to the inner surface, the second side wall is disposed in correspondence with the other side surface of the electro-optical panel; and
    an adhesion base extending continuously along an exterior surface of the frame from the external surface of the first side wall of the frame, to an external surface of the second side wall of the frame, the adhesion base being adhered to the non-display area of the electro-optical panel and the external surfaces of the first and second side walls of the frame.

2. The electro-optical device according to claim 1, wherein the electro-optical panel includes a first substrate and a second substrate opposing each other with the electro-optical material being disposed therebetween, the second substrate having a protrusion that extends beyond the first substrate and on which an integrated circuit for driving an electro-optical material is mounted, the protrusion is in the non-display area, the adhesion base extends continuously at least from the protrusion to the first side wall, the adhesion base is adhered to the protrusion and the first side wall.

3. The electro-optical device according to claim 2, wherein the protrusion is disposed between the first side wall and the second side wall.

4. The electro-optical device according to claim 3, wherein the frame has a bottom side that continues from the first and second side walls, the bottom has a surface facing away from the electro-optical panel, the adhesion base extends at least from the first side wall to the surface of the bottom side and is adhered to the surface of the bottom side.

5. The electro-optical device according to claim 3, wherein the adhesion base extends to the second side wall from the protrusion and is adhered to the second side wall.

6. The electro-optical device according to claim 3, further comprising another adhesion base, wherein the protrusion has a first area disposed adjacent the first side wall and a second area disposed adjacent the second side wall, and wherein the adhesion base extends continuously at least from the first area to the first side wall and is adhered to the first area and the first side wall, the other adhesion base extends continuously at least from the second area to the second side wall and is adhered to the second area and the second side wall.

7. The electro-optical device according to claim 2, wherein the protrusion has a side opposite to another side where the integrated circuit is mounted, the adhesion base is a light-shielding member which is adhered to the side of the protrusion and which intercepts light propagating towards the integrated circuit.

8. The electro-optical device according to claim 2, further comprising a flexible circuit board electrically connected to the electro-optical panel, wherein the adhesion base is an extending portion extending from the flexible circuit board.

9. The electro-optical device according to claim 2, further comprising:
a flexible circuit board electrically connected to the electro-optical panel and another adhesion base;
wherein the protrusion has a side opposite to another side where the integrated circuit is mounted, the adhesion base is a light-shielding member which is adhered to the side of the protrusion and which intercepts light propagating towards the integrated circuit, the other adhesion base is an extending portion extending from the flexible circuit board.

10. The electro-optical device according to claim 4, further comprising:
a light guide plate secured to the electro-optical panel and guiding light to the electro-optical panel;
a flexible circuit board electrically connected to the electro-optical panel, the flexible circuit having a first surface and a second surface facing opposite direction; and
a light source for supplying light to the light guide plate, the light source being mounted on the first surface of the flexible circuit board;
wherein the bottom side of the frame has an opening for inserting the light source, the flexible circuit board covers the opening, and the adhesion base is adhered to the second surface of the flexible circuit board.

11. The electro-optical device according to claim 6, wherein the adhesion base overlaps at least a portion of the other adhesion base and is adhered to the other adhesion base.

12. An electronic apparatus comprising the electro-optical device of claim 1.

13. An electro-optical device comprising:
an electro-optical panel including a display side and a side surface, the display side having a display area and a non-display area extending substantially within the same plane as the display area;
a frame holding the electro-optical panel and having a first side wall disposed in correspondence with at least the side surface of the electro-optical panel, the first side wall including an inner surface that faces the side surface of the electro-optical panel and an external surface that does not face the side surface of the electro-optical panel and is opposite to the inner surface; and
an adhesion base extending continuously along an exterior surface of the frame from the non-display area of the electro-optical panel to the external surface of the first side wall of the frame, the adhesion base being adhered to the non-display area of the electro-optical panel and the external surface of the first side wall of the frame;
wherein the electro-optical panel includes a first substrate and a second substrate opposing each other with the electro-optical material being disposed therebetween, the second substrate having a protrusion that extends beyond the first substrate and on which an integrated circuit for driving an electro-optical material is mounted, the protrusion is in the non-display area, the adhesion base extends continuously at least from the protrusion to the first side wall, the adhesion base is adhered to the protrusion and the first side wall;
wherein the frame further having a second side wall being disposed in correspondence with another side surface of the electro-optical panel and opposing the first side wall with the protrusion being disposed therebetween; and
wherein the adhesion base extends to the second side wall from the protrusion and is adhered to the second side wall.

14. An electro-optical device comprising:
an electro-optical panel including a display side and a side surface, the display side having a display area and a non-display area extending substantially within the same plane as the display area;
a frame holding the electro-optical panel and having a first side wall disposed in correspondence with at least the side surface of the electro-optical panel, the first side wall including an inner surface that faces the side surface of the electro-optical panel and an external surface that does not face the side surface of the electro-optical panel and is opposite to the inner surface; and
an adhesion base extending continuously along an exterior surface of the frame from the non-display area of the electro-optical panel to the external surface of the first side wall of the frame, the adhesion base being adhered to the non-display area of the electro-optical panel and the external surface of the first side wall of the frame;
wherein the electro-optical panel includes a first substrate and a second substrate opposing each other with the electro-optical material being disposed therebetween, the second substrate having a protrusion that extends beyond the first substrate and on which an integrated circuit for driving an electro-optical material is mounted, the protrusion is in the non-display area, the adhesion base extends continuously at least from the protrusion to the first side wall, the adhesion base is adhered to the protrusion and the first side wall;

wherein the frame further having a second side wall being disposed in correspondence with another side surface of the electro-optical panel and opposing the first side wall with the protrusion being disposed therebetween; and further comprising another adhesion base, wherein the protrusion has a first area disposed adjacent the first side wall and a second area disposed adjacent the second side wall, and wherein the adhesion base extends continuously at least from the first area to the first side wall and is adhered to the first area and the first side wall, the other adhesion base extends continuously at least from the second area to the second side wall and is adhered to the second area and the second side wall.

15. An electro-optical device comprising:

an electro-optical panel including a display side and a side surface, the display side having a display area and a non-display area extending substantially within the same plane as the display area;

a frame holding the electro-optical panel and having a first side wall disposed in correspondence with at least the side surface of the electro-optical panel, the first side wall including an inner surface that faces the side surface of the electro-optical panel and an external surface that does not face the side surface of the electro-optical panel and is opposite to the inner surface; and an adhesion base extending continuously along an exterior surface of the frame from the non-display area of the electro-optical panel to the external surface of the first side wall of the frame, the adhesion base being adhered to the non-display area of the electro-optical panel and the external surface of the first side wall of the frame;

wherein the electro-optical panel includes a first substrate and a second substrate opposing each other with the electro-optical material being disposed therebetween, the second substrate having a protrusion that extends beyond the first substrate and on which an integrated circuit for driving an electro-optical material is mounted, the protrusion is in the non-display area, the adhesion base extends continuously at least from the protrusion to the first side wall, the adhesion base is adhered to the protrusion and the first side wall; and further comprising a flexible circuit board electrically connected to the electro-optical panel, wherein the adhesion base is an extending portion extending from the flexible circuit board.

* * * * *